(12) United States Patent
Matan et al.

(10) Patent No.: US 11,862,974 B2
(45) Date of Patent: *Jan. 2, 2024

(54) INTELLIGENT GRID OPERATING SYSTEM TO MANAGE DISTRIBUTED ENERGY RESOURCES IN A GRID NETWORK

(71) Applicant: Apparent Labs, LLC, Novato, CA (US)

(72) Inventors: Stefan Matan, Novato, CA (US); Fred C. Horton, Santa Rosa, CA (US); Frank P. Marrone, Cloverdale, CA (US)

(*) Notice: Subject to any disclaimer, the term of this patent is extended or adjusted under 35 U.S.C. 154(b) by 254 days.

This patent is subject to a terminal disclaimer.

(21) Appl. No.: 17/357,127

(22) Filed: Jun. 24, 2021

(65) Prior Publication Data

US 2021/0328456 A1   Oct. 21, 2021

Related U.S. Application Data

(63) Continuation of application No. 16/060,010, filed as application No. PCT/US2017/036234 on Jun. 6, 2017, now Pat. No. 11,056,913.

(Continued)

(51) Int. Cl.
*H02J 3/14* (2006.01)
*H02J 3/38* (2006.01)
(Continued)

(52) U.S. Cl.
CPC ............ *H02J 3/003* (2020.01); *G05B 19/042* (2013.01); *G06Q 10/0631* (2013.01);
(Continued)

(58) Field of Classification Search
CPC ...... H02J 3/14; H02J 3/18; H02J 3/381; H02J 13/00; G05B 15/02; G05B 19/402
(Continued)

(56) References Cited

U.S. PATENT DOCUMENTS 5,017,861 A * 5/1991 Hukuda ................... G01R 7/06
324/166
2010/0138363 A1   6/2010 Batterberry et al.
(Continued)

FOREIGN PATENT DOCUMENTS

CN          2930062 Y  *  8/2007
CN       102842914 A  * 12/2012
(Continued)

OTHER PUBLICATIONS

European Third Office Action, (EP Exam Report Article 94(3) EPC), for Patent Application No. 17810900.5, dated Aug. 22, 2022, 7 pages.
(Continued)

*Primary Examiner* — Ronald D Hartman, Jr.

(57) ABSTRACT

A grid distribution system aggregates energy resources of multiple distributed energy resources (DERs) and provides service to one or more energy markets with the DERs as a single market resource. The DERs can create data to indicate realtime local demand and local energy capacity of the DERs. Based on DER information and realtime market information, the system can compute how to provide one or more services to the power grid based on an aggregation of DER energy capacity.

20 Claims, 23 Drawing Sheets

Related U.S. Application Data

(60) Provisional application No. 62/346,541, filed on Jun. 6, 2016.

(51) Int. Cl.

| | | |
|---|---|---|
| *H02J 13/00* | (2006.01) | |
| *G05B 19/042* | (2006.01) | |
| *H02J 3/18* | (2006.01) | |
| *H02J 3/00* | (2006.01) | |
| *G06Q 50/06* | (2012.01) | |
| *H02J 3/16* | (2006.01) | |
| *H02J 7/32* | (2006.01) | |
| *G06Q 10/0631* | (2023.01) | |

(52) U.S. Cl.
CPC ............... *G06Q 50/06* (2013.01); *H02J 3/14* (2013.01); *H02J 3/16* (2013.01); *H02J 3/18* (2013.01); *H02J 3/38* (2013.01); *H02J 3/381* (2013.01); *H02J 7/32* (2013.01); *H02J 13/00* (2013.01); *G05B 2219/25338* (2013.01); *H02J 2203/20* (2020.01); *Y02B 70/3225* (2013.01); *Y02E 40/30* (2013.01); *Y02E 60/00* (2013.01); *Y04S 20/222* (2013.01); *Y04S 40/20* (2013.01)

(58) Field of Classification Search
USPC ......................................................... 700/287
See application file for complete search history.

(56) References Cited

U.S. PATENT DOCUMENTS

| | | |
|---|---|---|
| 2011/0196546 A1 | 8/2011 | Muller et al. |
| 2011/0282511 A1 | 11/2011 | Unetich |
| 2012/0150679 A1 | 6/2012 | Lazaris |
| 2016/0087432 A1 | 3/2016 | Matan et al. |
| 2016/0087440 A1 | 3/2016 | Matan et al. |
| 2016/0225562 A1* | 8/2016 | Franks ..................... H02H 3/08 |

FOREIGN PATENT DOCUMENTS

| | | | |
|---|---|---|---|
| CN | 203398874 U | * | 1/2014 |
| CN | 104239059 A | | 5/2018 |
| JP | 2001294910 A | | 10/2001 |
| WO | 2016027041 A1 | | 2/2016 |
| WO | 2017214210 A1 | | 12/2017 |

OTHER PUBLICATIONS

Raymond H Stevens: "Power Flow Direction Definitions for Metering of Bidirectional Power", IEEE Power Engineering Review, IEEE Inc, New York, US, vol. PER-3, No. 9, Sep. 1, 1983,(Sep. 1, 1983), pp. 34-35, 2 pages.
Korean and English Translation of the Notice of Preliminary Rejection for Patent Application No. 10-2019-7000466, dated Oct. 25, 2021, 10 pages.
Chinese and English Translation of P.R. China State Intellectual Property Office Second Office Action for Patent Application No. 201780043526.X, dated Oct. 18, 2022, 7 pages.
First Chinese Office Action of P.R. China State Intellectual Property Office for Patent Application No. 201780043526X, (Attorney Docket No. 8158P029CN), Mailed Mar. 14, 2022, 5 pages.
Australian First Examination Report for Patent Application No. 2017277399, dated May 3, 2021, 3 pages.
European Second Office Action for Patent Application No. 17810900. 5, dated Mar. 25, 2021, 7 pages. (EP Exam Report Article 94(3) EPC).
Extended European Search Report for Patent Application No. 17810900.5, dated Sep. 27, 2019, 8 pages.
First Office Action for U.S. Appl. No. 16/060,010, dated Apr. 3, 2020, 9 pages.
International Search Report and Written Opinion for PCT Patent Application No. PCT/US2017/036234, dated Sep. 12, 2017, 13 pages.
Notice of Allowance for U.S. Appl. No. 16/060,010, dated Feb. 19, 2021, 6 pages.
Second Office Action for U.S. Appl. No. 16/060,010, dated Oct. 28, 2020, 8 pages.

* cited by examiner

INTELLIGENT GRID OPERATING SYSTEM TO MANAGE DISTRIBUTED ENERGY RESOURCES IN A GRID NETWORK

PRIORITY

This application is a Continuation of and claims the benefit of priority of U.S. patent application Ser. No. 16/060,010 filed Jun. 6, 2018, which in turn is a U.S. National Phase application under 35 U.S.C. § 371 of International Application No. PCT/US17/36234 filed Jun. 6, 2017, which in turn is based on, and claims the benefit of priority of, U.S. Provisional Application No. 62/346,541, filed Jun. 6, 2016.

FIELD

Descriptions herein are generally directed to an electrical power grid, and more particular descriptions are directed to aggregated and local management of distributed energy resources.

BACKGROUND

The technological age in which we live runs on energy. Energy powers the machines, appliances, and gadgets that make our lives more productive and enjoyable. Energy, while remaining a finite resource, exists as the invisible enabler of innovation. Energy is the resource fueling the digital economies that foster global interconnection and empower future generations to take on greater challenges. However, few understand how energy works and what it takes to have a stable power grid to provide it to us.

Consumers typically only become aware of the finite nature of energy when one of two things happens: either power is suddenly lost during a blackout; or, the use of energy becomes very obvious in the form of a confusingly high utility bill. Otherwise, people tend to take energy for granted and expect public utility companies to worry about all aspects of it. However, as the demand for energy grows, debates also grow about how to meet the demand.

The complex system of infrastructural, regulatory, and economic interdependencies that enable energy generation, distribution, and transmission to consumers is collectively known as "the grid". The grid is traditionally centralized at a utility. There is centralized power generation and centralized management of the flow of energy within the grid, from the power producer to the customers who are the consumers of the energy. The grid includes a number of components to provide power to consumers, from coal-fired power plants, nuclear power plants, hydroelectric dams generators, wind farms, and solar farms that generate electricity; to transmission lines, substations, and interconnection equipment that transport it; to government regulatory bodies that determine and administer reliability standards.

The grid is traditionally based on one or more massive generators that can provide enough power to satisfy peak demand of interconnected consumers. A consumer can include a dwelling place, a business, a cellphone tower or other utility box, or other user of power or customer premises. The different consumers can have different peak demands, from the smallest user of energy to large businesses that have high power demands for heavy commercial equipment. Traditional grid architecture includes central management over both real and reactive power in the grid. The architecture of the grid has been largely unchanged since it was first designed over 100 years ago. Being based on a central generator, the grid is designed to push power "downstream" from the central generator to the point of consumption at the customer premises. The transmission can be hundreds of miles from the generator to the consumer, requiring infrastructure that is expensive to build and maintain, such as substations and neighborhood transformers to keep voltages in-phase with current delivered on the grid, and keep voltage levels at regulated levels.

Relatively recent technological advances have put significant strain on the power grid. Switched power supplies in most modern electronics require reactive power and introduce harmonic noise into the grid. The increased use of motors can degrade the power factor of the grid, offsetting the phase and voltage control of the grid, which reduces the efficiency of energy transmission. Recent adoption of so-called "green power" production at customer premises, such as through solar systems or wind systems, also puts strain on the grid. Seeing that the grid is designed for downstream flow, the real power that the customer energy generation tries to push back "upstream" on the grid must be compensated by additional reactive power controlled by the utility central management.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
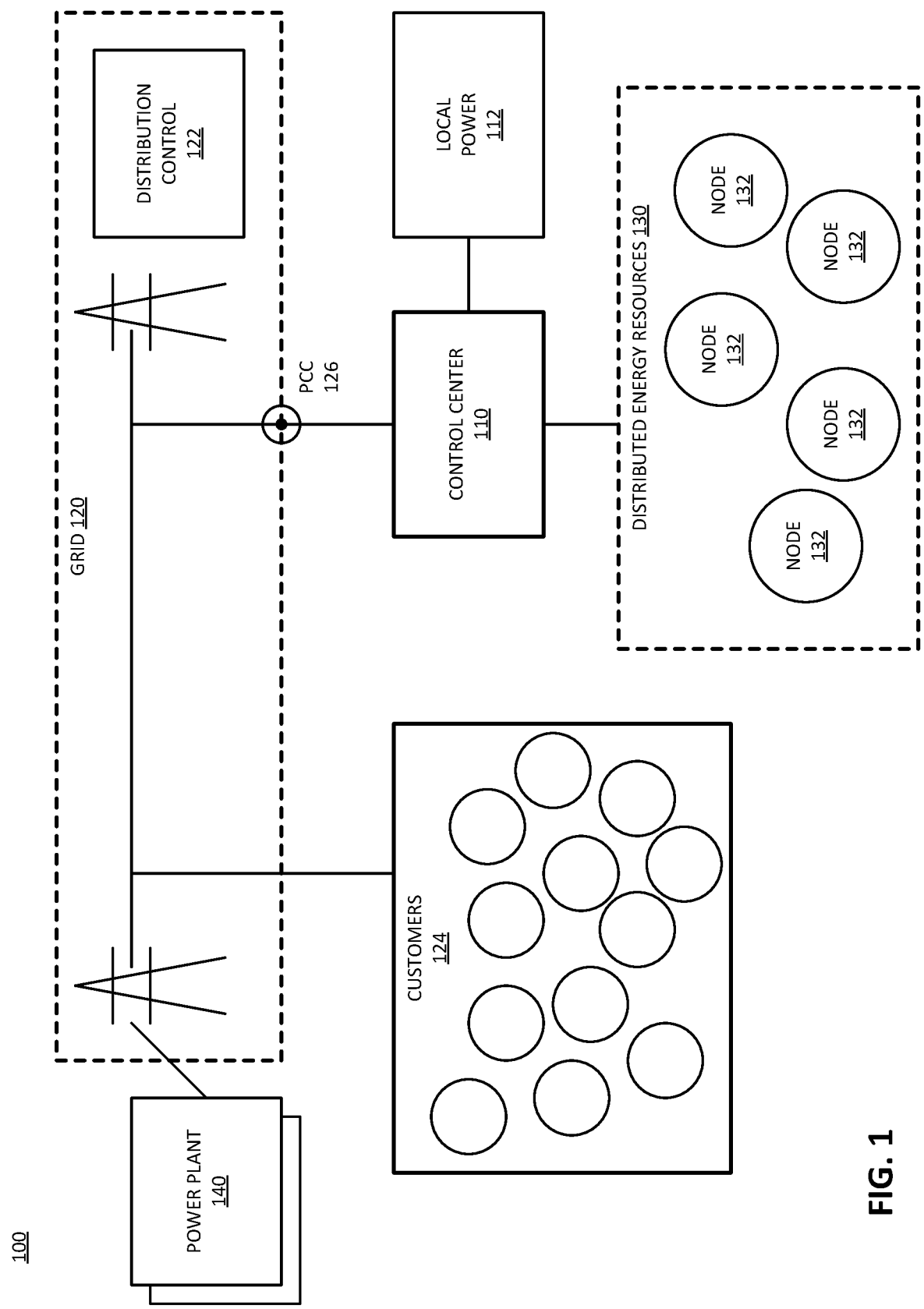
FIG. 1 is a block diagram of a system to manage distributed energy resources of a power grid.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a grid distribution system aggregates energy resources of multiple distributed energy resources (DERs) and provides service to one or more energy markets with the DERs as a single market resource. The DERs can create data to indicate realtime local demand and local energy capacity of the DERs. Based on DER information and realtime market information, the system can compute how to provide one or more services to the power grid based on an aggregation of DER energy capacity.

Power is delivered in a grid system as alternating current (AC) power, which involves sinusoidal current and voltage waveforms, which can be thought of as alternately pushing electricity and then pulling electricity in a periodic cycle. AC energy's capacity to flow in reverse directions and be modulated up or down in realtime by operator-monitored transformers enables its transmission across power lines at high voltage with minimum electric line losses due to heat. AC energy requires continuous, well-balanced control between real power and reactive power as it travels "downstream" from transmission lines, to substation and power lines, and eventually, to the end-user. Power delivered by the grid generally consists of a real power component and a reactive power component. Real power is measured in Watts, and refers to the active energy that does electrical work. Real power is delivered when the voltage waveform and current waveform are perfectly aligned in-phase. For efficient real power delivery, the timing of the demand for the active energy waveforms should match the timing of the delivery of the energy waveforms on the grid. When the timings are not aligned, there is power loss in the transfer of energy. Reactive power is measured in VARs (volt-amperes reactive), and refers to energy that ensures the two timings align, and therefore reduces power loss. Reactive power can be leading or lagging relative to the real power, based on the phase difference between the current and voltage waveforms.

Power as seen by a consumer can be understood differently from the energy itself provided to calculate the power. Power is typically represented by W dot h or Watt-hours. Multiplying the Watt-hours by the rate charged by the utility provides the dollar amount owed by the consumer to the utility. But energy can be represented in different ways, and can be measured in multiple different ways. Examples include (VA) or V dot I (voltage vector multiplied by current vector for volt-amps), V dot I dot PF (voltage vector multiplied by current vector times the power factor for Watts), and the square root of W^2 (square root of Watts squared for volt-amps-reactive). The consumer typically sees the power in Watt-hours which gives the cost of the energy delivered to the premises. Utilities have also started to measure and charge for reactive power consumption at the user premises.

There has been a significant increase in grid consumers adding renewable sources locally at the consumer locale to produce power. The renewable energy sources tend to be solar power or wind power or a combination, with a very significant number of solar systems being added. One limitation to customer power sources is that they tend to produce power at the same time, they produce only real power, and may cause real power to be pushed or exported back onto the grid (an upward injection of watts). The grid infrastructure is traditionally a one-way system, and the real power pushed back from the customer premises toward the central management and the central power source can create issues of grid voltage control and reactive power instability on the grid. These issues have caused grid operators to limit the amount of renewable energy that can be connected to the grid in some areas. In some cases, additional hardware or grid infrastructure is required at or near the consumer to control the flow of power back onto the grid.

In addition to the issues caused by renewable sources, the increase in use of air conditioning units and other loads that draw heavily on reactive power create additional strain for the grid management to keep grid voltages at regulated levels. Increased use of air conditioning has resulted in rolling brownouts and blackouts. Other times there are temporary interruptions on the grid as equipment interfaces are reset to deal with the changes in load when people return home from work and increase power consumption there. Traditionally, the central management must maintain compliance of grid regulations (such as voltage levels). Whenever something connected to the grid enters an overvoltage scenario, it shuts off from the grid, which can then create additional load on surrounding areas, resulting in larger areas of the grid coming down before the central management can restore grid stability.

In contrast to the traditional centralized management of the grid, an intelligent grid operating system (iGOS) provides the ability to distribute intelligence throughout the grid. In particular, iGOS can enable the interface with the grid at the point of consumption, such as behind the meter. In one embodiment, the iGOS enables an Aggregated Distributed Energy Resource (ADER) grid. An ADER grid provides virtual and modular components, with communication to offer the full complement of traditional power resources at any point in the system at any time. Grid operators benefit from greater control and oversight, such as being able to directly manage distributed energy generation the same as with traditional generators, which increases energy distribution efficiency. Increased look-ahead forecasting allows better economic modeling. Additionally, by providing energy management at the point of consumption, the ADER grid is much more stable relative to a traditional grid. With the ADER grid, the DERs can generate the reactive power needed to increase grid reliability and stability. The generation of the energy by the DER can be managed in a way to provide services to the grid, instead of ignorantly pushing real power back upstream.

In one embodiment, iGOS includes an automatic self-sufficient system that manages realtime data from sensing equipment, realtime data feeds, and measurements of generating resources (renewable, storage, generators, and more), with algorithmic computational devices to collect and analyze the realtime data. Based on the computations, the system can adjust its local operation and inject energy back in a specific proportion in amounts and time with real and reactive power. In one embodiment the iGOS system enables the realtime execution of dispatch and control through secure communication lines. The ADER grid can be enabled by DERs that implement iGOS in addition to an aggregating control center that also implements iGOS. The DERs can dynamic, on demand, generate any combination of real and reactive power on a device-by-device basis. The generation of the reactive power does not come at the expense of the generation of real power, and thus, the system can provide exactly the type of energy needed at the consumer as well as presenting the best interface to the grid for efficient transfer.

It will be understood that traditional systems perform power factor correction to adjust a power factor to improve the interface with the grid. However, traditional power factor correction requires routing all power through a load of capacitors or inductors or both to attempt to consume the imbalanced reactive energy to restore the power factor. Such systems only operate by pushing power through an additional load at additional loss of power. In contrast to traditional power factor correction, the DERs described herein can sit in parallel to a node where the energy flows, but instead of passing all power through an additional load, the DERs generate the proportional in timing and amount of real and reactive power needed to bring the voltage and current waveforms back to a desired alignment or desired offset. Such operation may be referred to as reactive power injection. Instead of setting up a reactive power load proportional to the real power load drawn to influence power factor, reactive power injection refers to injecting VARs into the point of common connection to adjust the effective impedance looking into the node. Such capability enables adapting the operation of the grid to evolving energy needs, working with the established infrastructure, and without necessitating an overhaul of the system.

In one embodiment, the iGOS can manage energy, capacity, and ancillary services in realtime. Grids are normally designed to be deterministic, where the determinism of available capacity and load demand prediction can inform the financial models needed to operate the grid. Such financial models include the pricing and operation of grid energy distribution. In addition to the load on the infrastructure, traditional renewables at the consumer end disrupt the determinism of the grid operation and management. The grid markets are designed to maintain stability through energy trading and distribution. However, there are certain cases where determinism is more highly valued than stability. The application of iGOS allows a grid to operate deterministically while also providing stability. The iGOS platform enables intelligent control individually at each node of a network of DERs, as well as aggregation for overall network stability.

In one embodiment, the iGOS platform includes nodes with sensors and information sources to make operating decisions based on forecasting, price signals, or other information, or a combination of information. The nodes provide iGOS management locally, and can provide realtime information in an aggregated node to a control center that can trade the energy on the markets. One or more groups of nodes connects to a substation, and one or more substations connect to a high voltage line. Energy trading occurs at the grid energy source level, which can be managed by an iGOS aggregation platform that can aggregate and market DER energy production based on management and information from the DERs or nodes.

FIG. 1 is a block diagram of a system to manage distributed energy resources of a power grid. System 100 represents a grid network, with grid 120 that includes distribution control 122 to transmit power along transmission lines. Traditionally, distribution control 122 managed downstream flow of power from one or more power plants 140 to various customer 124. Customers 124 represent any one or more groups of consumers, which connect at various locations downstream from power plant 140.

In one embodiment, at least certain customers 124 can be referred to as "prosumers," which are consumers who locally produce power. Traditional local power production in DERs can include power production with "generators," "backup generators," "renewable energy sources," or "on-site power systems." DERs refer to small-scale energy sources built close to homes or businesses where electricity is consumed. So-called "green power technologies such as solar or photovoltaic (PV) systems (where PV-cell flat panes mounted on rooftops convert sunlight into electricity), or wind systems (where turbines with fan blades positioned atop towers use wind to generate electricity) are among the most popular.

Expansion of traditional DERs among customer 124 can put strain on grid 120 through the unintelligent injection of watts into the grid. The injection of watts cannot be controlled in realtime like the flow of AC energy. The utilities tends to spread the costs associated with increased VAR requirements due to the injection of watts. In one embodiment, at least some of customers 124 include smart DERs 130. Control center 110 manages nodes 132 to aggregate and present the combined capabilities as a single energy resource available on one or more energy markets.

It will be understood that nodes 132 represent DER nodes that each have local energy generation resources. In one embodiment, control center 110 includes local power 112, which can be more like a "traditional" power plant, but with a smaller output capacity. In one embodiment, local power 112 can provide a base level of power available to aggregate with power from nodes 132 to trade on the energy market. Trading on the energy market refers to making a bid or an offer for services for one or more different types of energy services required by the grid, such as real power capacity, ancillary services such as voltage or reactive power support, demand/response services, or other services, or a combination. In one embodiment, control center 110 couples to grid 120 via PCC (point of common coupling or point of common connection) 126. PCC 126 can represent multiple different connection points, such as connection points for different DER nodes 132. Collectively, control center 110 can provide energy services to grid 120 via DERs 130.

In one embodiment, each node 132 executes iGOS. In one embodiment, control center 110 executes iGOS. In one embodiment, control center 110 executes a trading platform. DER nodes 132 include intelligence to provide realtime control of one or more microinverters or gateway devices, or a combination, which can monitor, analyze, control, aggregate, and predict the watt contributions of DER systems while simultaneously modulating the release of VARs. The monitoring of watts and VARs can provide optimum energy efficiency, which will maximize the consumer's cost-savings while also stabilizing the operations of grid 120.

In one embodiment, DERs 130 include an iGOS intelligent platform that leverages realtime telemetry or simultaneous measurements of watt and VARS output to transform a consumer's DER system into a virtual spinning generator. It will be understood that for a DER system to be a virtual spinning generator, the DER needs to do more than simply monitor realtime data, but to analyze and be able to adjust operation in realtime to affect its output operation in response to either the realtime data or external commands from control center 110 or grid 120, or a combination of realtime data and external commands. The DERs as virtual generators can then be deployed via dispatch or local autonomous control to inject accurate amounts of VARs to stabilize grid 120. In one embodiment, DERs 130 or control center 110 or both perform active modeling to "learn" behavior by recognize past patterns of usage, which can further enable behind-the-meter stabilization to occur independently of utility operators.

In one embodiment, each node 132 includes an intelligent platform that reacts to demand-response situations. A demand-response situation is one where end-users are provided with financial incentives to curtail energy use. In one embodiment, nodes 132 can signal the local DER system (such as through local generation and storage capabilities) to increase an output of watts to compensate for the energy that would usually derive from grid 120. With an appropriate real and reactive power response, the consumer can benefit from cost-savings resulting from use of DER power, as well as receiving a financial reward offered by the utility for decrease of energy loads.

In one embodiment, the iGOS system or intelligent platform as operational in DERs 130 or control center 110 or both, can provide analytical aggregation of information. For example, system 100 can collect information related to daily, weekly, weekend, monthly, or seasonal usages, or a combination. In one embodiment, a node 132 can learn the energy signature and energy behaviors of various appliance loads such as refrigerators, lighting, or others, or a combination. In one embodiment, DER nodes 132 include secure connection to control center 110, or some entity of grid 120, or both. The secure connection can include encrypted, firewall-supported channels a network of utility companies or other markets in which the energy resource may participate. For communication, DERs 130 and control center 110 include communication hardware, such as routers, hardware network interfaces, network protocol stacks, drivers, software applications, or other components, or a combination. Through the communication links the DERs can provide realtime data to control center 110, which can then aggregate information from multiple DERs to bid on the energy markets.

Figure 2:
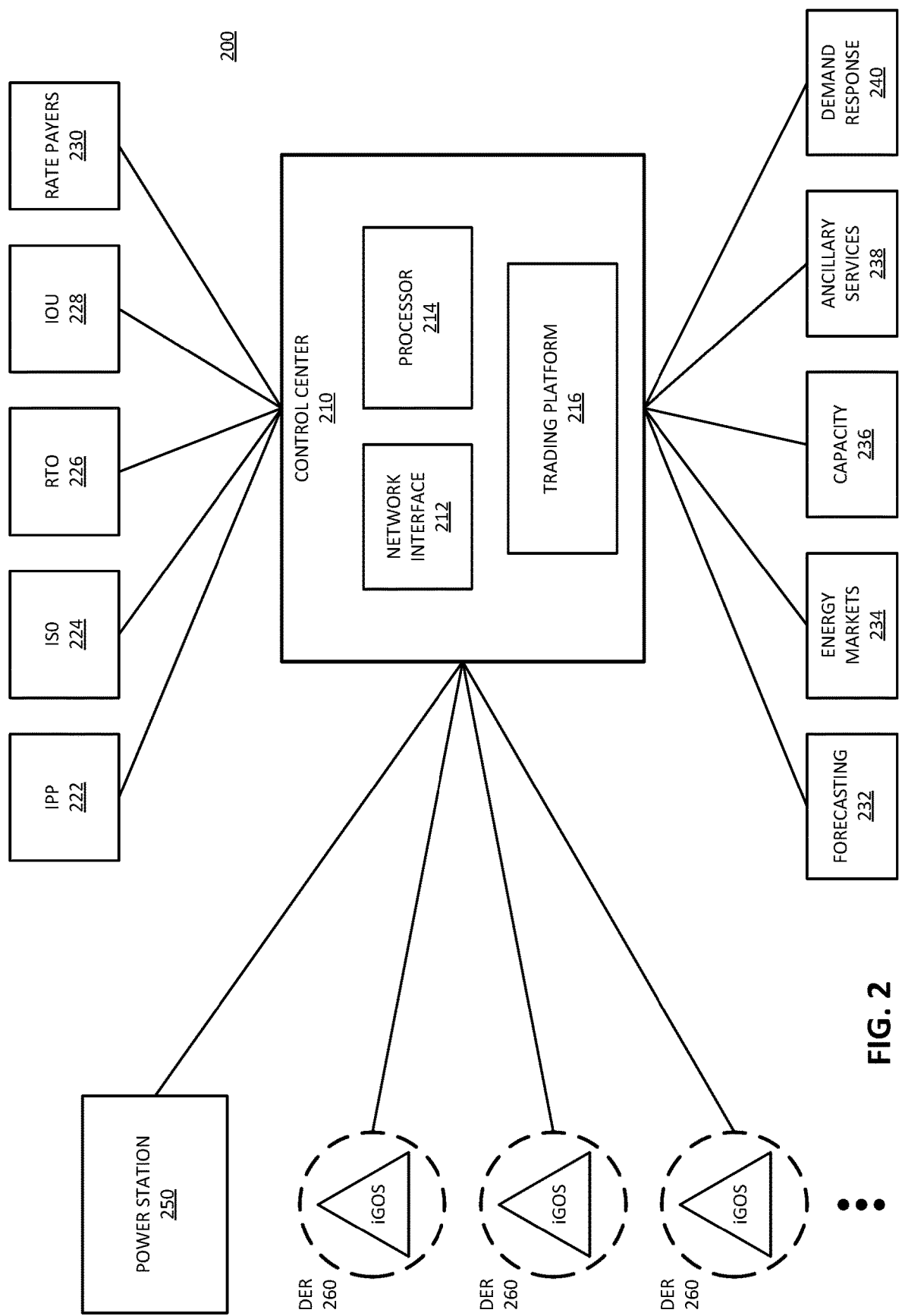
FIG. 2 is a block diagram of an embodiment of a control center to manage distributed energy resources of a power grid.

FIG. 2 is a block diagram of an embodiment of a control center to manage distributed energy resources of a power grid. System 200 provides a representation of a control center that can include an energy trading desk or energy trading platform. Control center 210 represents a control center in accordance with any embodiment described herein. Control center 210 includes hardware elements to function, such as network interface 212 and processor 214. Network interface 212 represents one or more network interface devices or circuits to interconnect with DERs 260, and other sources of information, such as realtime market information. Control center 210 can receive information from DERs and provide commands to them through network interface 212.

Processor 214 represents one or more processing resources, and can be or include CPUs, servers, computers, or other computing resources. Processor 214 enables control center 210 to perform calculations to determine how to use realtime data and energy resources of DERs 260. While not explicitly shown, in one embodiment, processor 214 executes iGOS or an intelligent computation and control platform. While not specifically illustrated, control center 210 includes memory or storage or a combination to store data for use and for computations.

With the hardware resources, control center 210 can execute trading platform or trading desk 216. In one embodiment, trading platform 216 includes one or more software programs or software agents that processor 214 executes to perform trading functionality. Trading platform 216 enables control center 210 to determine what market demand is, aggregate and compute an ability to service at least part of the demand, and make a bid to provide the services. Trading platform 216 allows the aggregation and presentation of some of all of DERs 260 as a single service provider to provide the service. In one embodiment, system 200 includes power station 250, which can represent energy generation resources local to control center 210, and are energy generation resources in addition to those of DERs 260. In one embodiment, control center 210 aggregates and presents energy resources for bidding on an energy market, including those of power station 250.

Control center 210 can provide energy distribution or other distributed energy resource management for DERs 260 based on information from, or to provide service to, one or more of IPP 222, ISO 224, RTO 226, IOU 228, or rate payers 230, or a combination. IPP (independent power producer) 222 represents other generators or participants in the energy market. ISO (independent system operator) 224 represents entities that control and manage grid distribution or transmission resources. ISO 224 generally represents the energy markets as the entities that accept bids from power producers. RTO (regional transmission operator) 226 refers to regional transmission controllers such as transformers and substations. IOU (investment owned utility) 228 represents utility operators. Rate payers 230 represent the regulators and organizations that set standards for the utility.

Control center 210 can provide any one or all of the following services: forecasting 232, realtime (edge) energy market services 234, capacity 236, ancillary services 238, or demand response 240, or a combination. Forecasting 232 represents an ability to participate in markets that look ahead by weeks or days, and commit to providing energy services. Realtime (edge) energy markets 234 represent short term markets, such as 15 minute markets, and bid services out to such markets. Capacity 236 can provide or absorb energy to average out operation of the grid. Ancillary services 238 represents support services to manage, for example, the voltage and power factor of the grid. Demand/response 240 represents an ability to either reduce energy usage, or increase energy output to reduce an amount of energy demanded of the grid. Other services are possible.

DER aggregation is becoming more common. Recent regulations by FERC (Federal Energy Regulation Committee) permits the aggregation and trading of energy from DERs in CAISO (California Independent System Operator) territories. It is anticipated that other markets will follow. With such regulations, aggregation of multiple iGOS nodes provides valuable services to the grid, which can also benefit the system owners for DERs that are capable of aggregation. With the technologies provided herein, rather than creating a stress on the grid, the DERs for renewable energy resources become important market participants to achieve the stability and reliability needed from the power grid. It also opens the energy market to participation by smaller systems that would otherwise likely have to curtail valuable energy generated.

While certain examples are provided, it will be understood in general that there is a great deal of interdependent regulatory, infrastructural, and economic planning and preparation that continually go into ensuring that the lights turn on when we flip the switch. The grid already has huge energy generators, transformer towers, and power lines that provide an immense amount of power. With iGOS, rather than having to continue to build that infrastructure out to meet peak demand that is only short-lived, DERs can drop the overall big-scale infrastructure needs by aggregation of small resources.

The markets are controlled by laws and regulation, which govern the transmission and distribution of power by utilities. Market participants regularly and simultaneously negotiate "day-ahead" and "peak" prices in multiple markets across the country. These are the day-ahead and spot markets. The day-ahead market conducts sales and purchases of wholesale electricity at a fixed price to meet the forecasted load or demand for the following operating day. Spot markets are held to meet peak energy demands in excess of a given day's forecasted load.

Despite this immense system that is in place, prior to the deployment of renewables, for most everyday consumers of electrical energy, the utility companies that send the bill represent the entire grid system. The intelligent platforms described herein enable the continuation of the decentralization that has already begun with renewable adoption. Electrical energy as a commodity is now frequently bought and resold in transactions known as "sales for resale" across utility companies and other retail marketers a number of times between the moment of production and the moment of consumption by end-users. With system 200, DERs can participate in that market.

System 200 not only enables participation of DERs 260 in the energy markets, it really provides a smarter smart grid by distributing intelligence. With participation by DERs 260, the energy can be generated and managed for realtime markets and services at the load where it is needed most. In one embodiment, each DER 260 performs monitoring, protection, and optimization through multiple sensors fed it into multiple algorithms. In one embodiment, information from the realtime market is fed it into algorithms to issue signals for dispatch of energy resources to keep the balance at multiple levels (load, substation, energy transport, demand/respond, time of day, energy to storage, energy from storage, energy to load from solar, energy to load from storage, energy from renewables, or others, or a combination). In one embodiment, control center 210 and trading platform 216 can aggregate from a plurality of available DERs 260. Thus, control center 210 may send commands to selected ones of DERs 260 for services to provide services for an energy market. In one embodiment, control center 210 attempts to maximize the availability of services, and aggregates from all DERs possible or available for contributing. In response to control signals or commands, the DERs can change operation to provide the services on the grid. In one embodiment, the DERs provide energy for local customers. In one embodiment, iGOS can determine that it is more cost effective to provide a service on an energy market, and purchase power from the grid for a local customer. Thus, in one embodiment, the system provides services to the grid for an energy market, while continuing to service a local customer. In one embodiment, the system provides power to the local customer from the grid, or at least partially from the grid, and uses some or all energy resources to provide a service to an energy market. In one embodiment, trading platform 216 computes whether a bid can be made to meet demand in a market, based on availability of DERs 260 and energy resources from the DERs.

Figure 3:
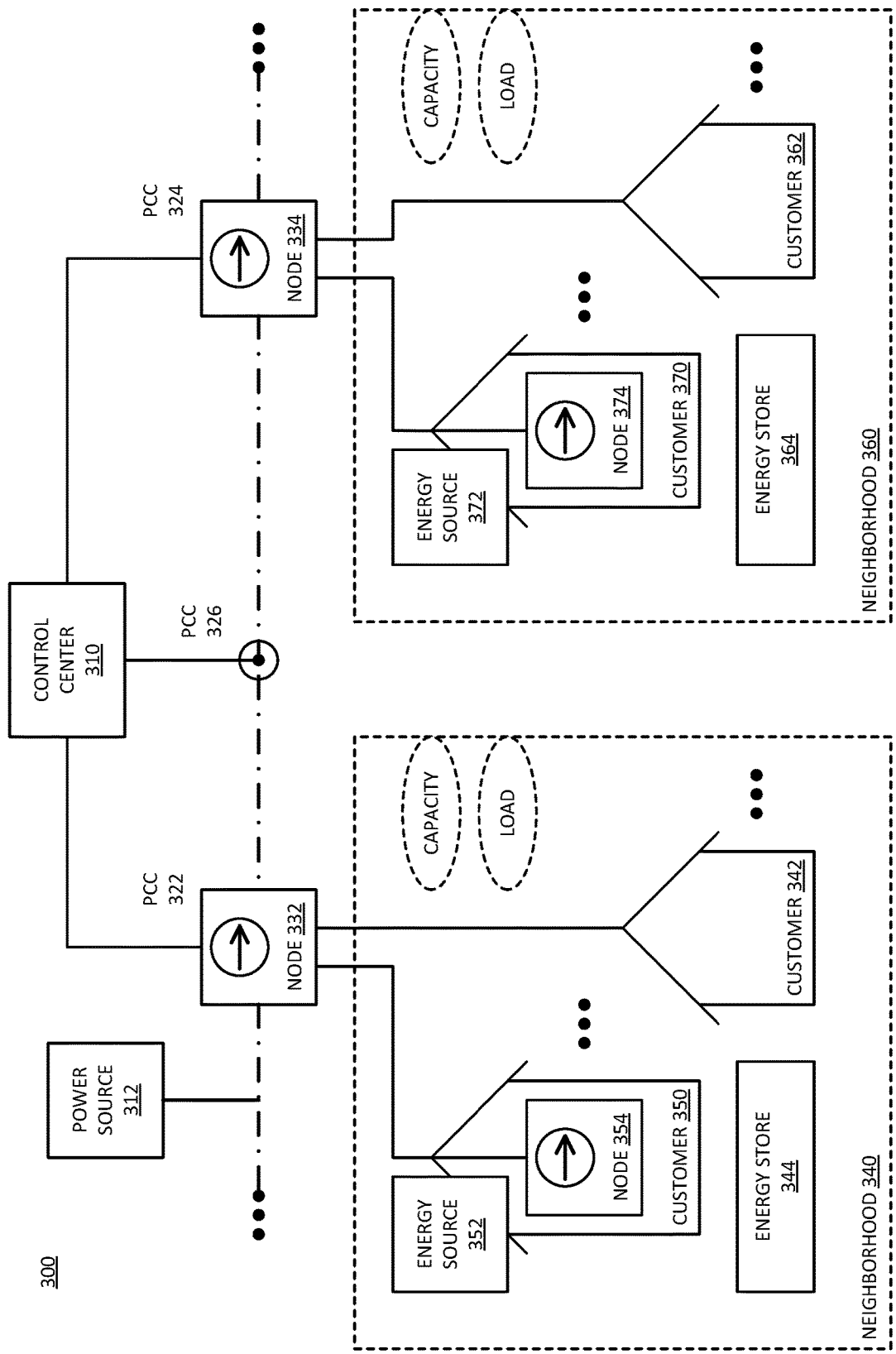
FIG. 3 is a block diagram of an embodiment of a distributed grid system.

FIG. 3 is a block diagram of an embodiment of a distributed grid system. System 300 includes a grid network, and can be one example of a grid network or system in accordance with an embodiment of system 100. System 300 may be only a segment or portion of one of the previously-described systems. In one embodiment, system 300 is a grid network that operates without central grid management. In one embodiment, system 300 is a grid network that operates without a central power plant or other large-scale power source that provides power to the entire grid. In one embodiment, system 300 is a virtual grid or a modular grid. In one embodiment, system 300 is a virtual grid that can connect to a traditional grid as an independent segment. In one embodiment, system 300 can connect to other virtual grid or modular grid segments.

System 300 illustrates neighborhood 340 and neighborhood 360, which represent sub-portions of the grid that can have any number of consumers that do and do not include local energy sources, and can include any number of consumers that do and do not include local control nodes. Neighborhood 340 couples to control node 332. Similarly, neighborhood couples to control node 334. Control nodes 332 and 334 manage DERs. In one embodiment, a control node can manage multiple DERs. Control nodes 332 and 334 are coupled to each other by some infrastructure, which may be the same as a grid infrastructure, or may simply be a power line having sufficient capacity to enable the control nodes to couple to each other and provide electrical support to each other.

In one embodiment, control node 332 can be PCC 322 and control node 334 can be PCC 324. In one embodiment, control nodes 332 and 334 are coupled to control center 310, which can aggregate information about the operation of multiple distributed nodes within the grid network of system 300. In one embodiment, control center 310 includes processing and analysis engines that can determine what operation each node should take in response to grid conditions. In one embodiment, control center 310 is similar to central grid management, but it can be simpler. Whereas central grid management typically controls interconnection or interface of a central power plant to the grid and potentially the operation of a substation, data center can provide information to distributed nodes. The distributed nodes can independently operate within their segment of the grid network to respond to grid conditions. In one embodiment, control center 310 provides dispatch information to the distributed control nodes.

In one embodiment, neighborhood 340 includes one or more consumers 342 that do not have local energy sources. In one embodiment, neighborhood 340 includes one or more consumers 350 that include local energy source 352 and DER node 354. The energy source and DER node can be in accordance with any embodiment referred to herein. In general, neighborhood 340 has a total load that represents the power demand within the neighborhood, and a total capacity that represents the power generation within the neighborhood. The load minus the capacity can represent the net power demand, which can be positive or negative. A negative power demand can indicate that neighborhood 340 generates more energy than will be consumed by its local consumers. It will be understood that power demand fluctuates throughout the day and year as consumers use and generate different amounts of power. Control node 332 can continuously monitor the net power demand for its associated neighborhood 340.

In one embodiment, neighborhood 360 includes one or more consumers 362 that do not have local energy sources, and one or more consumers 370 that include local energy source 372 and DER node 374. The description of neighborhood 340 can apply equally well to neighborhood 360. Neighborhood 360 also has a total load that represents the power demand within the neighborhood, and a total capacity that represents the power generation within the neighborhood, which can be completely different from those of neighborhood 340.

In one embodiment, either or both of the neighborhoods can include local energy storage. For example, neighborhood 340 is illustrated with energy store 344, and neighborhood 360 is illustrated with energy store 364. In one embodiment, at least one neighborhood does not include energy storage. In one embodiment, all neighborhoods include energy storage. Energy store 344 and 364 represent any type of energy storage that can exist within the neighborhoods. Energy store 344 and 364 can represent a sum of all local energy storage resources of individual consumers within the neighborhood. In one embodiment, one or more neighborhood includes a neighborhood energy store. The neighborhood energy store can be in addition to or as an alternative to local energy storage at the individual consumers.

In one embodiment, energy store 344 and 364 can include battery resources, which can include any type of battery. A battery is a device that stores energy via chemical or electrical means or a combination, and the energy can later be accessed. However, energy storage is not limited to batteries. For example, in one embodiment, an energy store, either local to one consumer or shared among multiple consumers or the entire neighborhood, includes a mechanism to perform work to convert active energy into potential energy, which can then later be recovered via conversion back from potential energy to active energy. For example, consider a water storage system as an energy store. When excess capacity exists within a consume and/or within the neighborhood, the system can trigger a pump to operate on the excess power to pump water "uphill," essentially in any manner to pump against gravity. Recovery of the energy can include allowing the water to flow back downhill with gravity to turn a generator or mini-generator to generate energy. Another alternative can be to use energy to compress air, and then run a generator with the air as it is decompressed. It will be understood that other examples could also be used where energy storage is not limited to traditional battery resources.

In one embodiment, system 300 is a segment of a grid that includes distributed control. In such a scenario, each node within a grid network hierarchy can manage its own conditions at its PCC for compliance with standards or expectations of performance. In one embodiment, each node can also provide electrical support to neighboring segments or PCCs as it sees conditions at the grid network side (upstream from its segment) fall in performance. In one embodiment, each node can provide electrical support to neighboring segments or PCCs in response to receiving information from control center 310, from other nodes, or dispatch or control information from a central management.

In one embodiment, system 300 includes one or more power sources 312 coupled to provide power to the grid network. One or more power sources 312 can be in addition to local energy sources at consumers. In one embodiment, no single power source 312 has sufficient capacity to meet consumer power demands. For example, rather than an industrial or utility-scale power plant, one or more power sources 312 can be included local to a segment of the grid. The segment can be within a neighborhood or shared among multiple neighborhoods. Power sources 312 can include smaller scale generators that would be smaller than a full utility implementation, but larger than what would typically be used at a consumer or customer premises. Neighborhood-based power sources 312 can be directly associated with DER nodes (for example, power source 312 can be coupled to and controlled by DER devices of node 332). The control node can manage the output of the power source. In one embodiment, power source 312 enables control center 310 to trade energy as an aggregation of DERs for system 300.

Without a large-scale power plant, or in addition to such a power plant, and with smaller-scale energy generation (e.g., a neighborhood generator, a neighborhood solar installation, a small-scale hydro-electric generator, or other power sources), a grid network can be installed with reduced infrastructure compared to today's grids. Such a modular grid network can enable the building out of a grid based on current needs and then interconnecting to other independent grid network segments. Each segment can continue to operate independently, but can then benefit from being able to better distribute power generation and power demand based on availability to and from neighboring segments. Each interface or interconnection can include one or more control nodes, which can include one or more power converters each, to control the use of power and the presentation of power upstream. Thus, a local grid network can be built, and then later coupled with another local grid network as another layer of grid network hierarchy is added to interface the two independent segments.

In one embodiment, consider that neighborhood 340 has multiple customer premises 350 that have local energy sources 352. Traditionally grids are designed and built to be unidirectional, as they are designed to deliver power from a single large-scale power plant to the consumers. With power generation at customer premises 350, neighborhood 340 and up through a connected grid can effectively become a bidirectional system where power can be delivered from the central power source to the consumers, but then the consumers can also generate excess capacity that is placed back out onto the grid. If the power generation for the neighborhood and neighboring neighborhoods exceeds instant power demand, the generated power will be pushed back up the grid toward to the power plant. Such a condition can challenge the grid infrastructure.

Grid operators (e.g., utilities) typically set limits on how much local power generation can be coupled to the grid, to reduce the risk of a scenario where significant amounts of energy get pushed back up the grid to the power plant. Such a limit is often referred to as saturation, where there is a threshold amount of capacity that is permitted to be attached to the grid. If the saturation threshold has been reached, a consumer typically has to pay for additional grid infrastructure (additional equipment) that will enable the utility to selectively disconnect the consumer's power generation from the grid. Such scenarios also put consumers and utilities at odds with each other, as the consumer does not get to see the same levels of cost reduction because the power generation cannot be used by the grid, and so the grid operator does not pay the consumer for it.

In one embodiment, system 300 can provide an alternative mechanism to deal with grid saturation. In one embodiment, the distributed control in system 300 can provide dynamic control over power demand and power generation as seen at a PCC and/or as seen at a customer premises or anywhere downstream from a control node. In one embodiment, the control node includes a power converter to control real and reactive power demand and real and reactive power generation. More specifically, the control node can adjust operation to affect a real power component of power as seen downstream from the PCC, and a real power component as seen upstream from the PCC. The control node can adjust operation to affect a reactive power component of power as seen downstream from the PCC, and a reactive power component as seen upstream from the PCC. In one embodiment, the control node can include one or more inverters or one or more microinverters as power converters to apply control over demand and generation.

In one embodiment, node 332 includes a grid connector to connect upstream in a grid network. The grid connector can include known connectors and high voltage and low voltage signal lines. Node 332 is or connects to a PCC (PCC 322) for the grid network segment of neighborhood 340. Node 332 includes control logic, such as a controller or microprocessor or other logic to determine how to operate. In one embodiment, node 332 determines that a saturation threshold has been reached within neighborhood 340. Such a determination can be a result of dynamic monitoring to determine that power generation exceeds power demand. Such a determination can be in response to a notification from a data center or central grid management. Such a determination can be in response to data from other distributed control nodes. In one embodiment, each energy source 352 in neighborhood 340 is associated with a control node 354 within the neighborhood. In one embodiment, each control node 354 is configured with information about the capacity of its associated energy source 352. In one embodiment, each local control node 354 registers with control node 332, which can allow node 332 to know a total capacity for neighborhood 340.

In one embodiment, node 332 knows a total peak real power demand for neighborhood 340, such as by configuration or dynamic identification via communication with meters or other equipment distributed at the consumers. In one embodiment, there is a threshold percentage of the total peak real power demand that identifies a value of real power, and when real power generation capacity exceeds the value, neighborhood is considered to be in saturation. In response to the saturation condition, in one embodiment, node 332 dynamically adjusts operation of power converter(s) to adjust an interface between neighborhood 340 and the grid. In one embodiment, node 332 adjusts a ratio of real power to reactive power for neighborhood 340 as seen from upstream from PCC 322 (e.g., as seen from PCC 324 or as seen from central grid management or another part of the grid network).

In one embodiment, node 332 receives dispatch information from data center 310 or central grid management indicating a level of grid saturation for neighborhood 340. In one embodiment, node 332 receives information from downstream such as a via meters and/or node(s) 354 indicating levels of grid saturation downstream from PCC 322. In one embodiment, node 332 adjusts at least an amount of real power generation with neighborhood 340, such as by communicating to downstream control nodes 354 to adjust their real power output. In one embodiment, node 332 can communicate downstream to cause control nodes 354 to change a ratio of reactive to real power output upstream. In one embodiment, node 332 adjusts real or reactive power generation or demand or a combination at PCC 322 to adjust the electrical conditions as seen upstream from PCC 322. In one embodiment, node 332 or node(s) 354 adjust operation to divert at least a portion of real or reactive power to energy store 344.

Figure 4A:
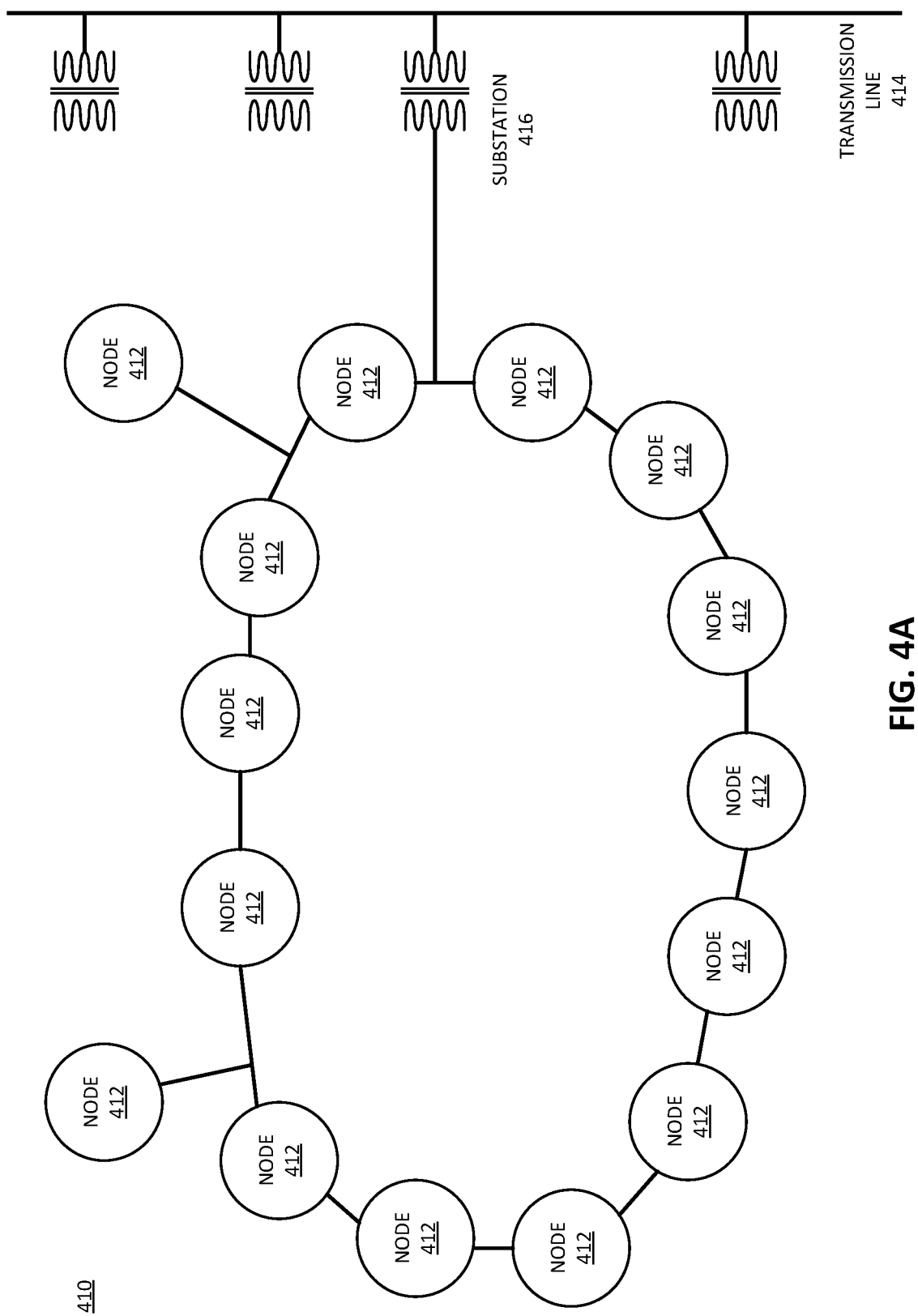
FIG. 4A is a block diagram of an embodiment of an aggregated DER grid.

FIG. 4A is a block diagram of an embodiment of an aggregated DER grid. Network 410 illustrates one example of a distribution grid, which can be an ADER grid. Network 410 includes multiple nodes 412, which can include an iGOS platform as described herein. The ADER grid can provide a homeowner-owned utility, or a consumer-based operational grid. Such a grid can also be referred to as a virtual grid. As illustrated in network 410, the distributed resource network can be or include a ring network. Network 410 couples to transmission line 414 of a power grid through transformer or substation 416. The transformers represent substations or other grid sub-divisions. Transmission line 414 represents a high-voltage grid transmission or distribution line.

Figure 4B:
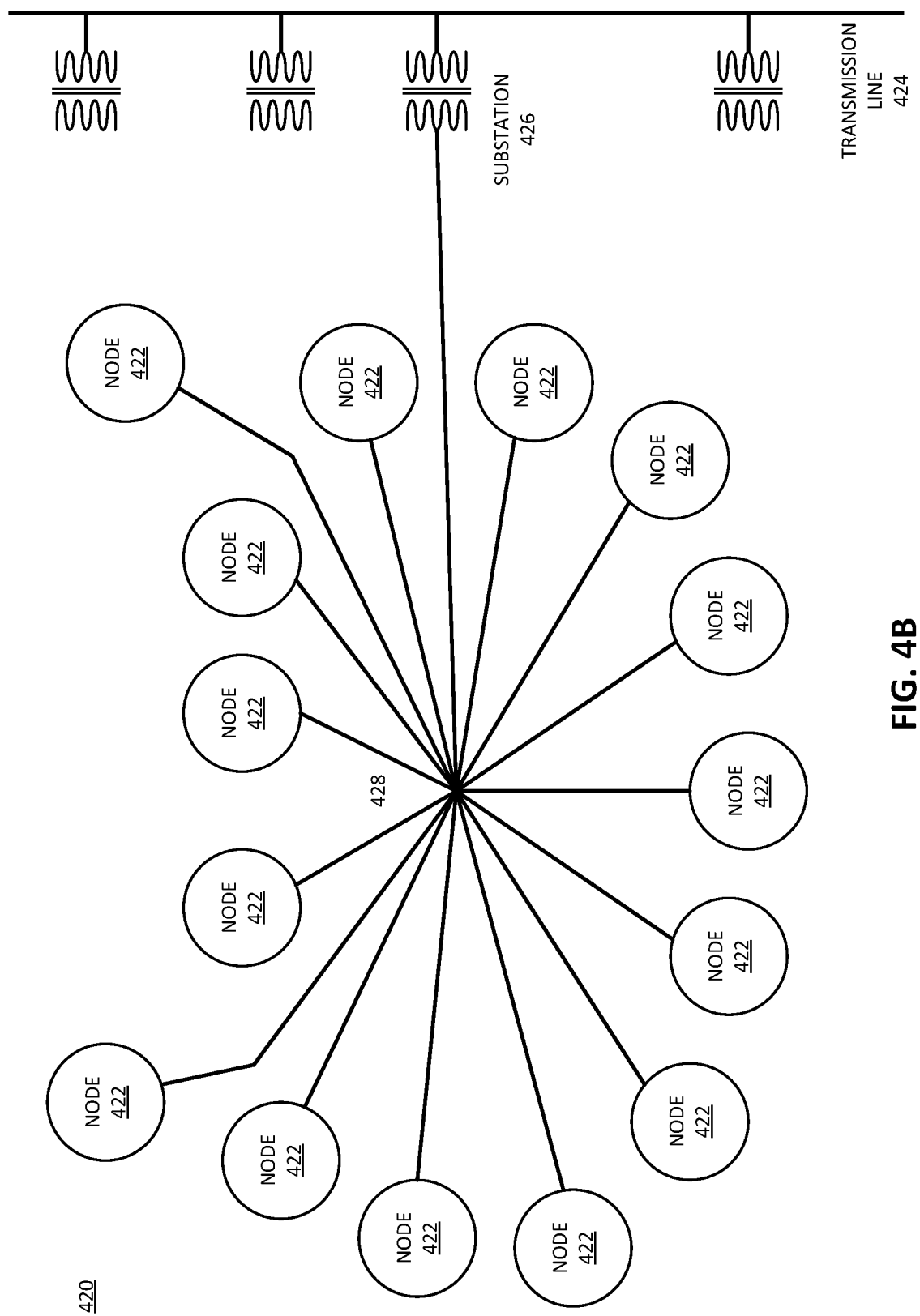
FIG. 4B is a block diagram of another embodiment of an aggregated DER grid.

FIG. 4B is a block diagram of another embodiment of an aggregated DER grid. Network 420 illustrates one example of a distribution grid, which can be an ADER grid. Network 420 includes multiple nodes 422, which can include an iGOS platform as described herein. The ADER grid can provide a homeowner-owned utility, or a consumer-based operational grid. Such a grid can also be referred to as a virtual grid. As illustrated in network 420, the distributed resource network can be or include a star network with central point 428. Network 420 couples to transmission line 424 of a power grid through transformer or substation 426. The transformers represent substations or other grid sub-divisions. Transmission line 424 represents a high-voltage grid transmission or distribution line.

Figure 4C:
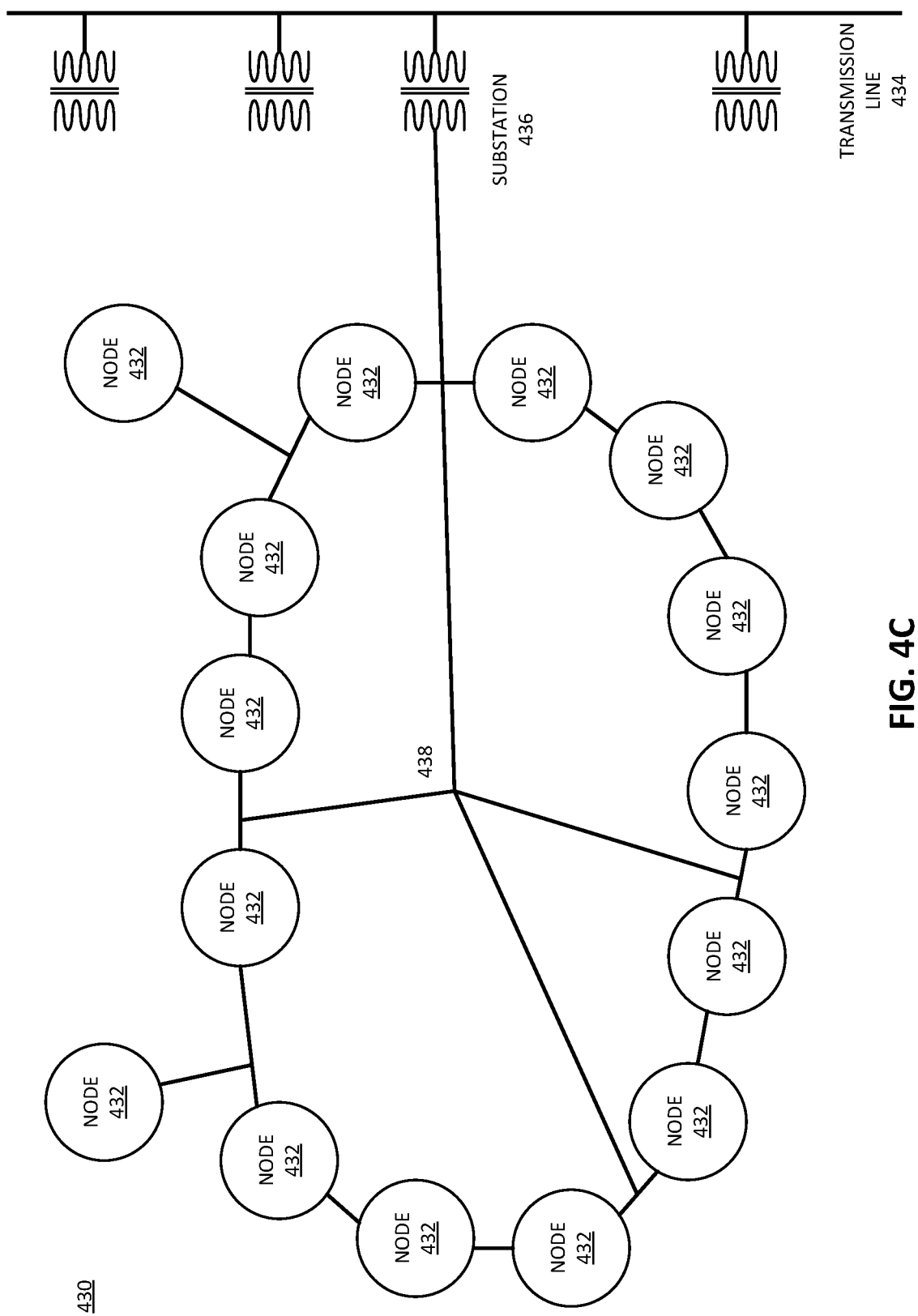
FIG. 4C is a block diagram of another embodiment of an aggregated DER grid.

FIG. 4C is a block diagram of another embodiment of an aggregated DER grid. Network 430 illustrates one example of a distribution grid, which can be an ADER grid. Network 430 includes multiple nodes 432, which can include an iGOS platform as described herein. The ADER grid can provide a homeowner-owned utility, or a consumer-based operational grid. Such a grid can also be referred to as a virtual grid. As illustrated in network 430, the distributed resource network can be or include a combination of a star network and a ring network, with central point 438. Network 430 couples to transmission line 434 of a power grid through transformer or substation 436. The transformers represent substations or other grid sub-divisions. Transmission line 434 represents a high-voltage grid transmission or distribution line. As seen in the fourth network representation, a substation can be a node in a higher-level substation. Thus, any combination of network organization can be applied.

Figure 4D:
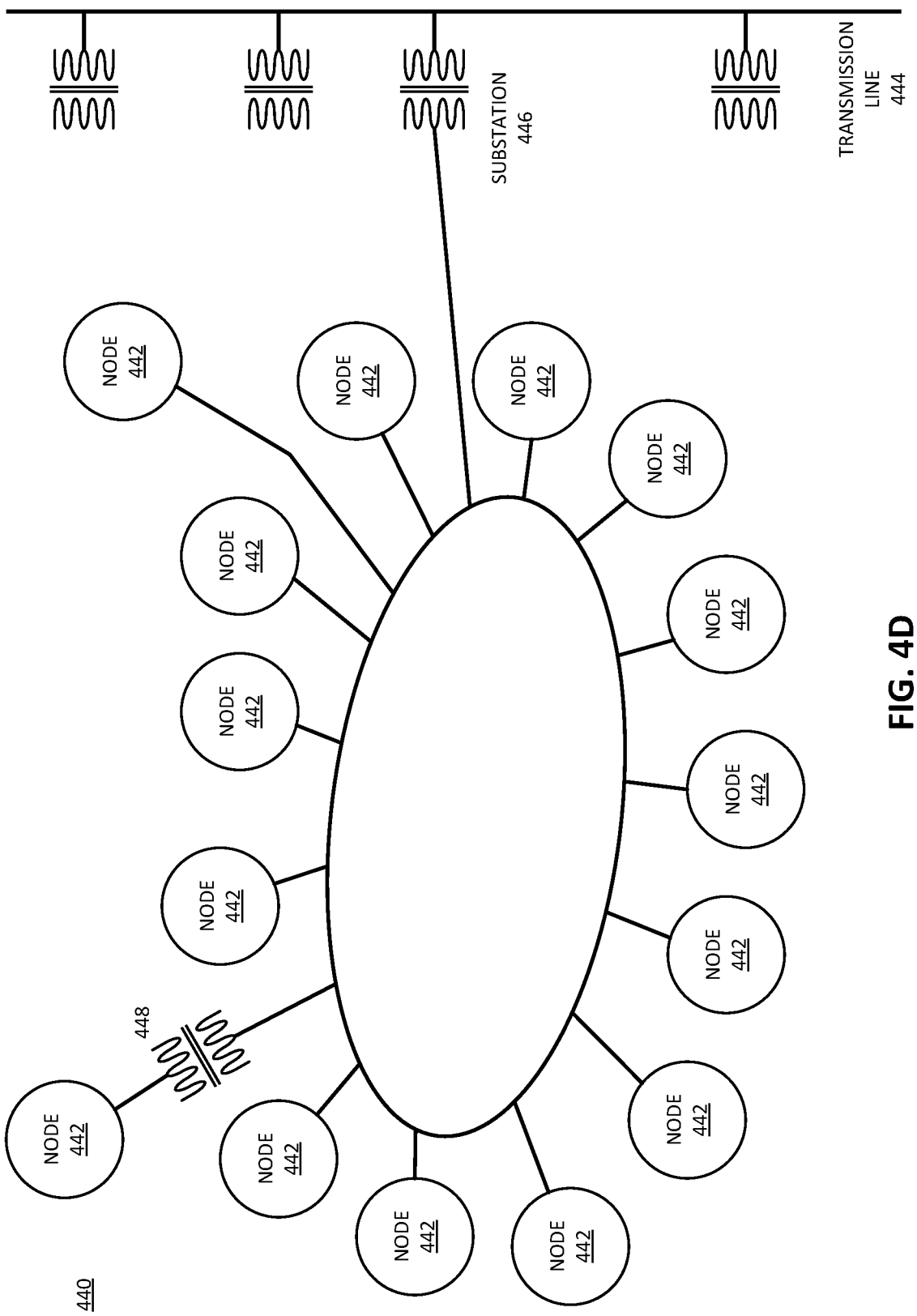
FIG. 4D is a block diagram of another embodiment of an aggregated DER grid.

FIG. 4D is a block diagram of another embodiment of an aggregated DER grid. Network 440 illustrates one example of a distribution grid, which can be an ADER grid. Network 440 includes multiple nodes 442, which can include an iGOS platform as described herein. The ADER grid can provide a homeowner-owned utility, or a consumer-based operational grid. Such a grid can also be referred to as a virtual grid. As illustrated in network 440, the distributed resource network can be or include a point to point ring network. Network 440 couples to transmission line 444 of a power grid through transformer or substation 446. The transformers represent substations or other grid sub-divisions. Transmission line 444 represents a high-voltage grid transmission or distribution line. In one embodiment, a substation can be a node in a higher-level substation, as illustrated by connection 448. Thus, any combination of network organization can be applied. As seen in the fourth network representation, a substation can be a node in a higher-level substation. Thus, any combination of network organization can be applied.

Figure 5:
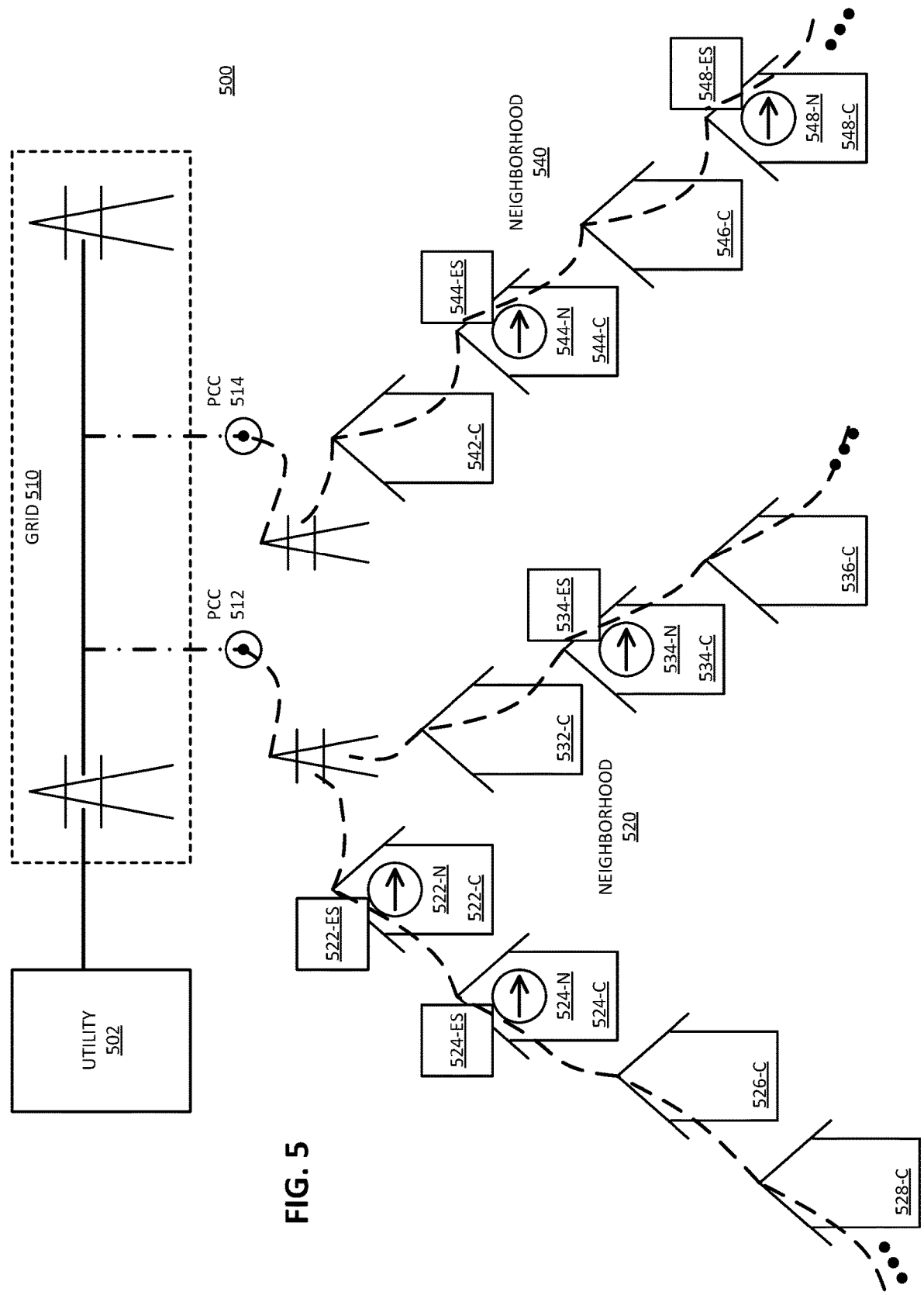
FIG. 5 is a block diagram of an embodiment of a system with monitoring and control of DERs among different neighborhoods.

FIG. 5 is a block diagram of an embodiment of a system with monitoring and control of DERs among different neighborhoods. System 500 represents a distribution environment for a utility grid. System 500 supports DER aggregation in accordance with any embodiment described herein. System 500 can be considered one example of an ADER grid. System 500 illustrates that aggregation of nodes, such as iGOS aggregation, can be implemented in parallel with traditional grid hardware. For example, not all customer premises in a neighborhood need to include DERs for the DER aggregation to work.

Grid 510 represents the grid infrastructure, which can include a central generator or power plant managed by utility 502, which can perform central grid management. System 500 illustrates two neighborhoods, 520 and 540, but it will be understood that any number of neighborhoods can be included in system 500. Neighborhoods 520 and 540 represent any segment or sub-segment of the grid. Neighborhood 520 couples to grid 510 via PCC 512, while neighborhood 540 couples to grid 510 via PCC 514. In one embodiment, neighborhoods 520 and 540 could couple to grid 510 through the same PCC.

Neighborhood 520 includes multiple utility customers 522-C, 524-C, 526-C, 528-C, 532-C, 534-C, and 536-C. It will be understood that in a typically system there may be dozens or hundreds of customers in a neighborhood. The customers can be any type of power consumer described herein. In one embodiment, a single consumer includes multiple customer premises. In one embodiment, one customer premises includes multiple consumers. In one embodiment, there is a one-to-one relationship between consumers and customer premises. It will be observed that customers 526-C, 528-C, 532-C, and 536-C do not have local energy sources or local power generation. Customers 522-C, 524-C, and 534-C include energy sources 522-ES, 524-ES, and 534-ES, respectively. The energy sources represent local power generation. The customers with energy sources include DER nodes or management nodes or intelligent platforms 522-N, 524-N, and 534-N, respectively. In one embodiment, the DER nodes manage the use of locally generated energy locally, and to manage the output of energy back to neighborhood 540 and ultimately to grid 510.

Neighborhood 540 is also illustrated to include multiple consumers, with customers 544-C and 548-C, respectively, including energy source 544-ES and node 544-N, and energy source 548-ES and node 544-N. Customers 542-C and 546-C do not include local power generation. The neighborhoods can include any number of consumers that do not include local power generation and any number of consumers that do include local power generation, and any combination.

System 500 does not specifically illustrate a control center for DER aggregation, but it will be understood that the DERs with energy generation sources can be aggregated to provide services to grid 510. In one embodiment, DERs from the two different neighborhoods can be aggregated for purposes of providing grid services. In one embodiment, only DERs within the same neighborhood will be aggregated for one or more services provided to an energy market. In one embodiment, for aggregation of DERs from different neighborhoods, the DERs must couple to a common PCC. In one embodiment, there is no such restriction for aggregation DERs from different neighborhoods, and as long as the control center can couple communicatively with the DERs and the DERs can provide the agreed services, then the DERs can be aggregated. In one embodiment, the ability to aggregate across neighborhoods depends on the services provided.

Figure 6:
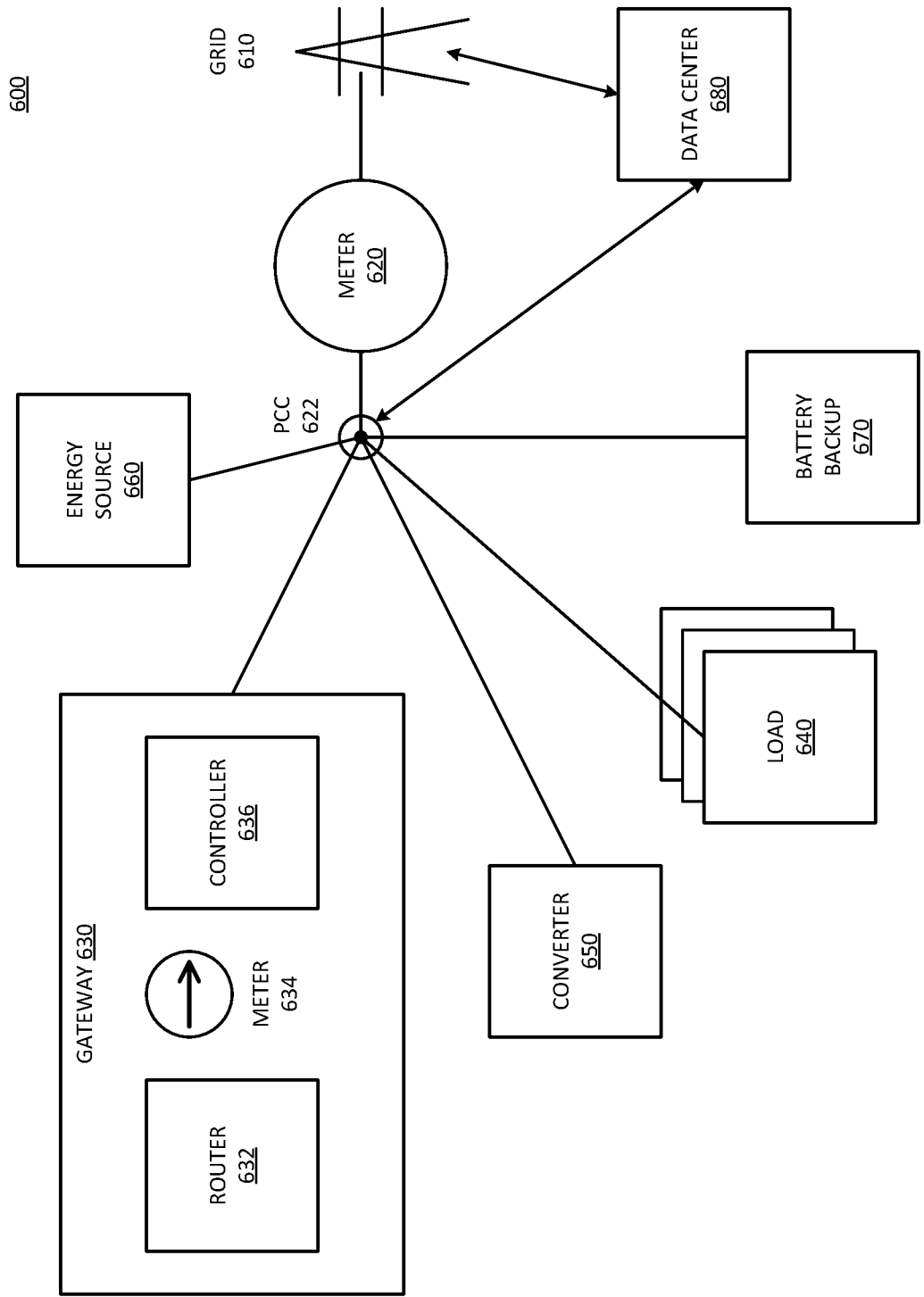
FIG. 6 is a block diagram of an embodiment of a gateway device in a distributed grid system.

FIG. 6 is a block diagram of an embodiment of a gateway device in a distributed grid system. System 600 represents one embodiment of a grid system, and can be a grid system in accordance with any embodiment described herein. Grid 610 represents a utility grid network on which DER aggregation is permitted. Meter 620 represents a grid meter, or a meter used within the grid to measure and charge for power delivered by the grid. In one embodiment, meter 620 can be considered part of the grid infrastructure and can be referred to as an entrance meter. In one embodiment, meter 620 is a four-quadrant meter. Meter 634 of gateway 630 is understood to be separate from meter 620. In one embodiment, meter 620 monitors power delivered by grid 610 to PCC 622, which represents a PCC in accordance with any embodiment described herein.

In one embodiment, system 600 includes gateway that can be and/or be part of a control node in accordance with any embodiment herein. In one embodiment, gateway 630 represents "the brains" of a control node or DER node. In one embodiment, gateway includes router 632 to enable gateway 630 to communicate with other devices, such as devices outside of the PCC. In one embodiment, router 632 enables gateway 630 to communicate with data center 680. Data center 680 can represent a central data location for a distributed grid network or a control center in accordance with any embodiment described herein. In one embodiment, data center 680 can provide dispatch information from central grid management. Thus, data center 680 represents a source of grid-based information, such as control, dispatch information, or other data about grid operation, as well as other aggregation information. In one embodiment, router 632 includes Ethernet connections or other connections that use Internet protocols. In one embodiment, router 632 includes grid interconnections. In one embodiment, router 632 includes proprietary connectors. In one embodiment, router 632 represents a stack or protocol engine within gateway 630 to generate and process communication in addition to the hardware connectors that provide an interface or connection to the grid.

In one embodiment, gateway 630 includes meter 634, which represents a metering device, and can be four-quadrant meter. Meter 634 enables gateway 630 to monitor power demand or power generation or both on the consumer side of PCC 622. The consumer side of PCC 622 is the side opposite the grid. The consumer side is the electrical point of contact to the loads or load control for the consumer. Typically the PCC includes some type of fuse system or other disconnection mechanism. The fuse system can be soft fuses (e.g., switches or other mechanisms that can be electrically opened and closed) or hard fuses that must be mechanically or physically reset or replaced. In one embodiment, gateway 634 performs aggregation based at least in part on data gathered by meter 634.

Gateway 630 includes controller 636, which represents hardware processing resources to control the operation of the gateway. Controller 636 can also represent software or firmware logic to control the operations of gateway 630. In one embodiment, controller 636 can be implemented by more than one hardware component. In one embodiment, controller 636 includes or is an embedded computer system. For example, controller 636 can include an embedded PC (personal computer) board and/or other hardware logic. Controller 636 generally controls the operation of gateway 630, such as controlling router 632 and/or meter 634. In one embodiment, if gateway 630 is said to do something, controller 636 can be considered to execute operations to perform what is said to be done.

In one embodiment, system 600 includes one or more loads 640 on the consumer side of PCC 622. In one embodiment, system 600 includes one or more energy sources 660. Energy source 660 represents a power generation resource at the consumer or on the consumer side of PCC 622. In one embodiment, energy source 660 is a renewable energy source, such as wind or solar power systems. In one embodiment, energy source 660 generates real power. In one embodiment, system 600 includes battery backup 670. Battery backup can be any form of energy store or energy storage described herein.

In one embodiment, the consumer includes local power converter 650. Converter 650 can be in accordance with any embodiment of a converter described herein. Converter 650 performs one or more operations to manage or control an interface with the grid. In one embodiment, the interface represents the interconnection of a device to PCC 622. In one embodiment, the interface represents the electrical interconnection or electrical coupling of a device to another point. For example, converter 650 can operate to adjust an interface between PCC 622 and loads 640, such as by changing how power or energy is transferred between the grid and the load. In one embodiment, converter 650 can operate to adjust an interface between energy source 660 and load 640, for example, to deliver power to the load from a local energy source. In one embodiment, converter 650 can operate to adjust an interface between energy source 660 and PCC 622, for example, to deliver power from the energy source to the grid. In one embodiment, converter 650 can operate to adjust an interface between battery backup 670 and PCC 622 and/or energy source 660, for example, to charge the energy store and/or provide power from the energy store to use for the load or the grid or both.

Converter 650 enables system 600 to generate any combination of real and reactive power from energy source 660. Thus, converter 650 enables the customer to perform reactive power injection into PCC 622 to adjust how the customer is seen from the grid side (i.e., from the perspective of meter 620. In one embodiment, converter 650 adjusts operation in response to one or more commands from data center 680 to adjust a combination of real and reactive power provided by the DER at PCC 622.

Figure 7:
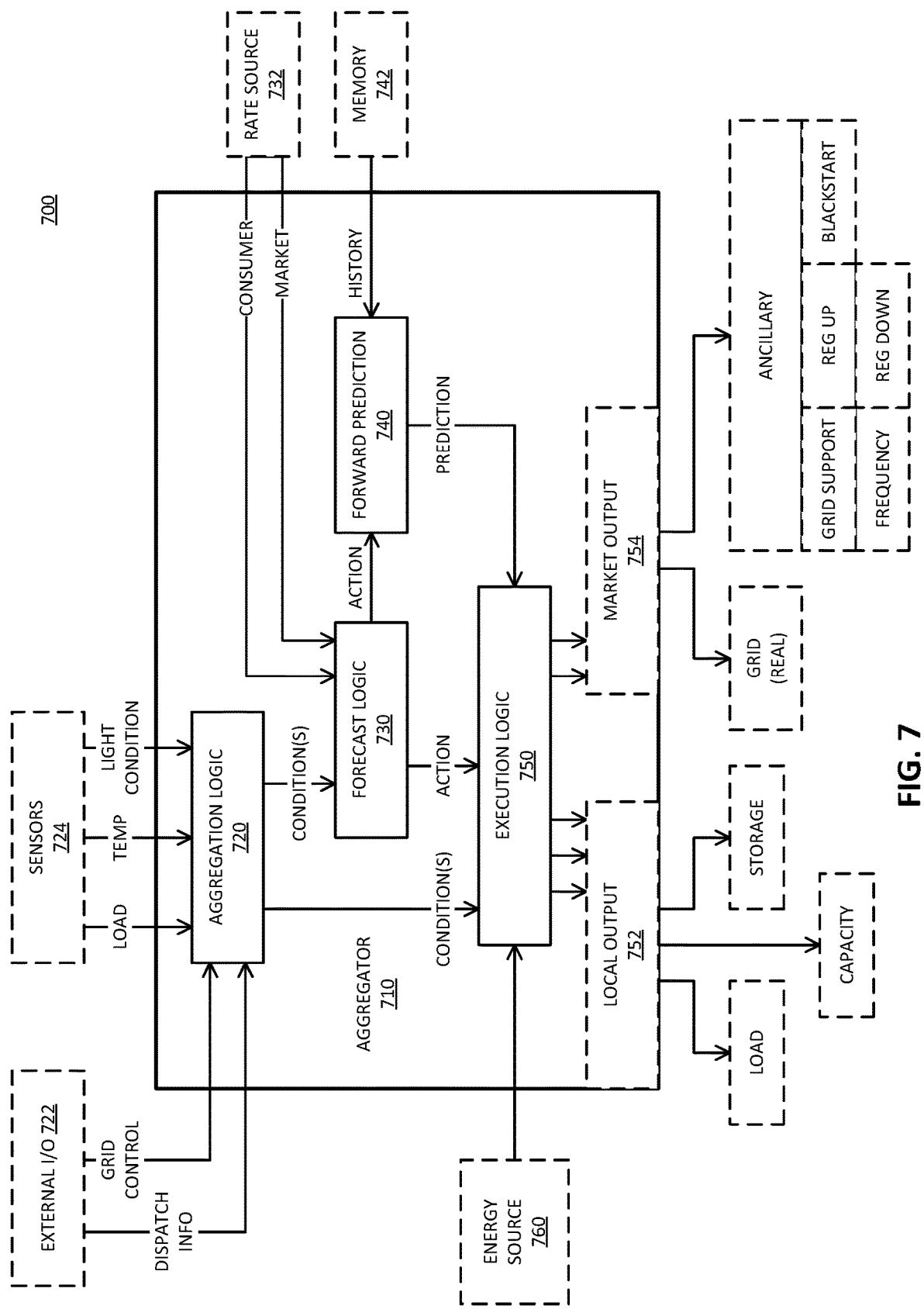
FIG. 7 is a block diagram of an embodiment of a gateway aggregator system.

FIG. 7 is a block diagram of an embodiment of a gateway aggregator system. System 700 is one embodiment of a gateway device, and can be or be included in a control node or DER node in accordance with any embodiment described herein. Aggregator 710 represents hardware and software logic to perform aggregation of data. Aggregator 710 can compute a determination of how to control an interface based on the aggregated information. In one embodiment, system 700 can be considered part of iGOS. Based on local and network information, aggregator 710 can determine how to manage energy within a DER node.

Aggregation logic 720 represents logic that enables aggregator 710 to gather multiple elements of data related to electrical grid conditions. External I/O 722 represents sources external to a PCC, or on the "other side" of a meter, which can provide grid condition information. Typically such information is provided in light of conditions of the grid as a whole or of specific segments or sections of the grid that are larger than the consumer or neighborhood or portion managed by a control node associated with aggregator 710. Examples of external I/O 722 can include, but are not limited to, dispatch information and grid control signals. Dispatch information can be broadcast to a grid network or can be sent to specific areas in a grid network. Grid control represents specific signals indicating at least one electrical condition the PCC is supposed to comply with and/or address. For example, the PCC can be requested to provide specific output from the PCC. As another example, the PCC can be specifically requested to comply with a regulation based on conditions at another location of the grid network.

Sensors 724 represent sources of data within the PCC, for example, one or more sensors local to a control node or other gateway device or aggregation device. Examples of sensor data can include, but are not limited to, load information, local temperature, light conditions, and/or other information. In one embodiment, load information is gathered or monitored by a meter that determines what loads are drawing power, such as by energy signatures that indicate complex current vectors for the load. In one embodiment, load information can be configured into aggregator 710, which can be maximum load capacities allowed for specific load connections (e.g., breakers, outlets, or other connection). In one embodiment, the operation of a local energy source can be affected by temperature, or the temperature can be an indication of expected efficiency or demand for certain loads and/or energy sources. Light condition is specific to solar systems, but other sensors such as wind sensors could alternatively or additionally be used.

Each sensor can provide information to be considered when determining how to output power or otherwise control interfaces within the PCC or external to the PCC. In one embodiment, each sensor registers with aggregation logic 720. Aggregation logic 720 can include a sensor control hub to gather and aggregate information from the various sensors. In one embodiment, aggregator 710 stores aggregation data or raw data in memory 742. Memory 742 can be local to aggregator 710 and store sensor or grid control information.

In one embodiment, aggregation logic 720 includes weights to provide greater weight to certain data over other data. The weights can change based on time or based on other data received. For example, temperature data can be considered in determining what operations to perform, but can be weighted very low or ignored completely when grid control is received. Countless other examples are possible. In one embodiment, aggregation logic 720 operates as a type of complex state machine. In one embodiment, each condition output generated by aggregation logic 720 identifies a state as determined based on the various inputs. For example, aggregation logic 720 can make determinations based on ranges of data, such as when light conditions are within a given range and the temperature is within a specific range, and when the grid conditions are within certain ranges, then a particular condition output is generated. Other ranges will produce other condition outputs. The condition outputs can indicate what the state of aggregator 710 is to determine how to control a power converter to operate.

In one embodiment, aggregation logic 720 generates one or more conditions for execution by execution logic 750. In one embodiment, aggregator 710 can include zero or more other logic elements to make changes to the determined conditions. In one embodiment, aggregator 710 includes either forecast logic 730 or forward prediction 740 or both. In one embodiment, all logic blocks within aggregator 710 can be considered control logic for the aggregator. Thus, reference to the aggregator performing computations or calculations can include operations of aggregation logic 720, forecast logic 730, forward prediction logic 740, execution logic 750, or other logic not shown, or a combination.

In one embodiment, forecast logic 730 can receive rate source information 732. Rate source information 732 can include consumer rate or price information or market rate or market price information. In one embodiment, consumer rates will include different rates for real and reactive power. In one embodiment, market rates will include different rates for real and reactive power. Reactive power can generally be delivered to the grid for an "ancillary market" or to provide ancillary services. Thus, reactive power rates can actually include many different rates depending on market conditions and the ancillary market selected. It will be understood that rate information can change throughout the day, or through the season or year. Thus, time of day and time of year can be information considered in computing operations to perform based on rate information. In one embodiment, rate source 732 is a realtime rate information source, and can provide data related to a deregulated energy market, such as rate contract information, instantaneous rates, or other information, or a combination. In one embodiment, aggregator 710 couples to rate source 732 via external I/O 722.

In one embodiment, forecast logic 730 makes a determination or calculates an operation to perform based on the condition(s) identified by aggregation logic 720 and rate information. Forecast logic 730 can determine one or more actions to take based on combining rate information with condition information. For example, a determined condition as calculated by aggregation logic 720 can identify a specific state or zone of operation for an interface managed by aggregator 710. Aggregator 710 is associated with a control node that can provide power to local loads and to the grid. Thus, forecast logic 730 can determine the best use of locally generated energy, for example. Forecast logic 730 can determine how to best control interfaces based on where the maximum financial reward is for the consumer.

For example, in a given day market price might fluctuate between real power and ancillary services, depending on the conditions of the grid network. When real power rates are higher, forecast logic 730 can determine to cause an associated power converter to generate real power to transmit to the grid. If one or more ancillary market prices then goes higher than real power market rates, forecast logic 730 can determine to cause the power converter to generate reactive power to transmit to the grid. In another example, consider that the consumer has loads that have load demand. However, because market rates are currently higher than the value of consuming the energy locally, forecast logic 730 determines to transmit the energy to the grid, and draw power from the grid to power the loads. Similarly, when market rates drop, forecast logic 730 can determine to redirect more energy to the local load demand. Thus, aggregator 710 can dynamically monitor and control the interface to the grid from the local PCC to maximize the value of energy for the local consumer and for the grid.

In one embodiment, forward prediction 740 accesses historical information from memory 742. The historical information can include one or more conditions with associated operations performed, historical trend information for rates, electrical conditions, power demand, and/or other information. The history or historical information can enable aggregator 710 to identify trends or patterns based on previous operation. Thus, the longer a control node is operational, the more its historical data can inform operation. In one embodiment, aggregator 710 includes a period of data gathering prior to using history information. The time of data gathering can be variable for the different uses of an aggregator, but can be a matter of hours, days, weeks, or even months. In one embodiment, such information can be gradually "phased in" by gradually giving more weight to historical data analysis or evaluation or calculation of what operations to perform.

In one embodiment, historical data can identify particular states of operation and subsequent states of operation and how long elapsed between them. Thus, for example, forward prediction can determine whether or not to perform a determined action based on historical information indicating whether such a condition or state is likely to persist for long enough for economic benefit. In one embodiment, forward prediction 740 determines from selected actions or state and historical data what operations should be executed by a control node. In one embodiment, each prediction represents an estimate of what decision to make based on present conditions in light of past data of energy loads, energy prices, weather conditions, rates, or other information. In one embodiment, the historical data can be referred to as operating history or operational data, referring to operations within the monitored/controlled grid node.

In one embodiment, execution logic 750 receives one or more conditions, one or more actions, or one or more predictions, respectively, from aggregation logic 720, forecast logic 730, and forward prediction logic 740. Execution logic 750 can analyze the input data and compute or calculate one or more operations to perform based on the received data. In one embodiment, collectively, aggregator 710 can have knowledge of connected local energy sources, entrance meter information, energy store or energy backup system, local or onsite loads, and other information. In one embodiment, all the information gathered within a gateway device such as aggregator 710 is gathered by a local meter. Logic within aggregator 710 can receive the data from the multiple sources and make decisions based on the data. The aggregation of data itself is different from previous control nodes. Forecasting or prediction can be added to the aggregator. In one embodiment, execution logic 750 selectively generates an operation based on computed conditions, actions, and predictions.

Consider an example that a meter detects that a refrigeration load has turned on and more reactive power is needed. The meter could make such a determination, for example, by computing or processing different load energy signatures of the loads. For example, consider a composite current that is already present in the system. The addition of another load coming online will change the overall composite current. In one embodiment, the meter can compute a difference between the new composite current and the previous composite current to determine the energy signature of the new load(s). As such, the meter can identify the specific load and determine to effect a change in operation via aggregator 710 to respond to the power demands of the specific load. It will be understood that such computations could require vector analysis and/or calculations to distinguish specific loads. In one embodiment, aggregator 710 can keep historical data for one or more energy signatures, and can thus determine how long a given load is expected to be on, based on historical averages. Thus, energy signatures can be used with historical data or other determination data computed in aggregator to determine what operation(s) to execute.

Continuing with the example of the refrigeration load coming online, in one embodiment, the meter detects the increased demand for reactive power in the system. In one embodiment, the meter detects the energy signature of the refrigeration load. The gateway can have an attached solar system (local energy source) adjust its phase angle (e.g., via a converter and/or inverter coupled to the solar system) to produce more reactive power to address the refrigeration load. Once the refrigeration load turns off, the gateway can then tell the solar system to use the extra power to charge a battery backup system, or provide support to the grid. Again, the different possible examples are too numerous to address.

In one embodiment, execution logic 750 generates an operation and executes the operation. In one embodiment, execution logic 750 can generate an operation for local output 752 or for market output 754. Example local outputs can include, but are not limited to, providing real or reactive power or both to a load, providing real or reactive power or both to charge an energy storage device, or providing power to local "capacity," which can represent one or more load and one or more energy storage devices. Examples of market outputs can include, but are not limited to, providing real power to the grid, or providing ancillary services.

The ancillary services can include many different services, which are represented generically, even though not all possible services are illustrated. Ancillary services can include grid support, frequency support, regulation up, regulation down, or blackstart services, or other services, or a combination. Grid support represents any type of voltage support services to boost or reduce the grid voltage condition at the PCC. Regulation up and regulation down refer to specific frequency support services. Regulation up and regulation down can refer to controlling load interfaces to change a load seen at the PCC. Frequency support represents other types of frequency service, and can include changing an interface to change a flow of energy onto the grid to adjust a frequency of the AC power as seen at the PCC. Blackstart service represents operations performed to ramp a grid up to enable a disconnected portion of the grid to reconnect to the grid network. All ancillary services can include providing capacity that responds to a need by the grid as seen from the PCC. In one embodiment, aggregator 710 provides non-export services, referring to refraining from placing real power (watts) onto the grid.

In general, in one embodiment, a DER node can be or include a control node. Typically a control node includes an energy meter and a controller. The controller can be in accordance with aggregator 710 or other gateway device. The energy meter and the controller are located on the consumer side of the PCC, and perform operations within the PCC to change an interface as seen from the grid via the PCC. The consumer node includes one or more power converters that change their operation in response to commands or controls from the controller or meter. The power converter operation changes the interfaces to the PCC in accordance with decisions made by the controller. Operation by the power converter(s) can change the flow of energy within a grid network at the local node.

Thus, the power converter can respond to aggregation information by changing operation in response to a decision by a controller that determines how to operate based on the aggregation information. The aggregation information can include information from one or more sensors, one or more grid-side controllers or data center, and local power demand and local conditions. The decision-making by the controller can include computing based on the gathered local and grid condition information. In one embodiment, the decision-making includes computing based on rate information. In one embodiment, the decision-making includes computing based on historical information. In one embodiment, the decision-making includes computing by execution logic to generate one or more controls for one or more power converters. The power converters change the flow of energy within the PCC or between the PCC and the grid, in accordance with any embodiment described herein. The power converters can control a mix of real and reactive power from a local energy source or from the grid, in accordance with any embodiment described herein.

Figure 8:
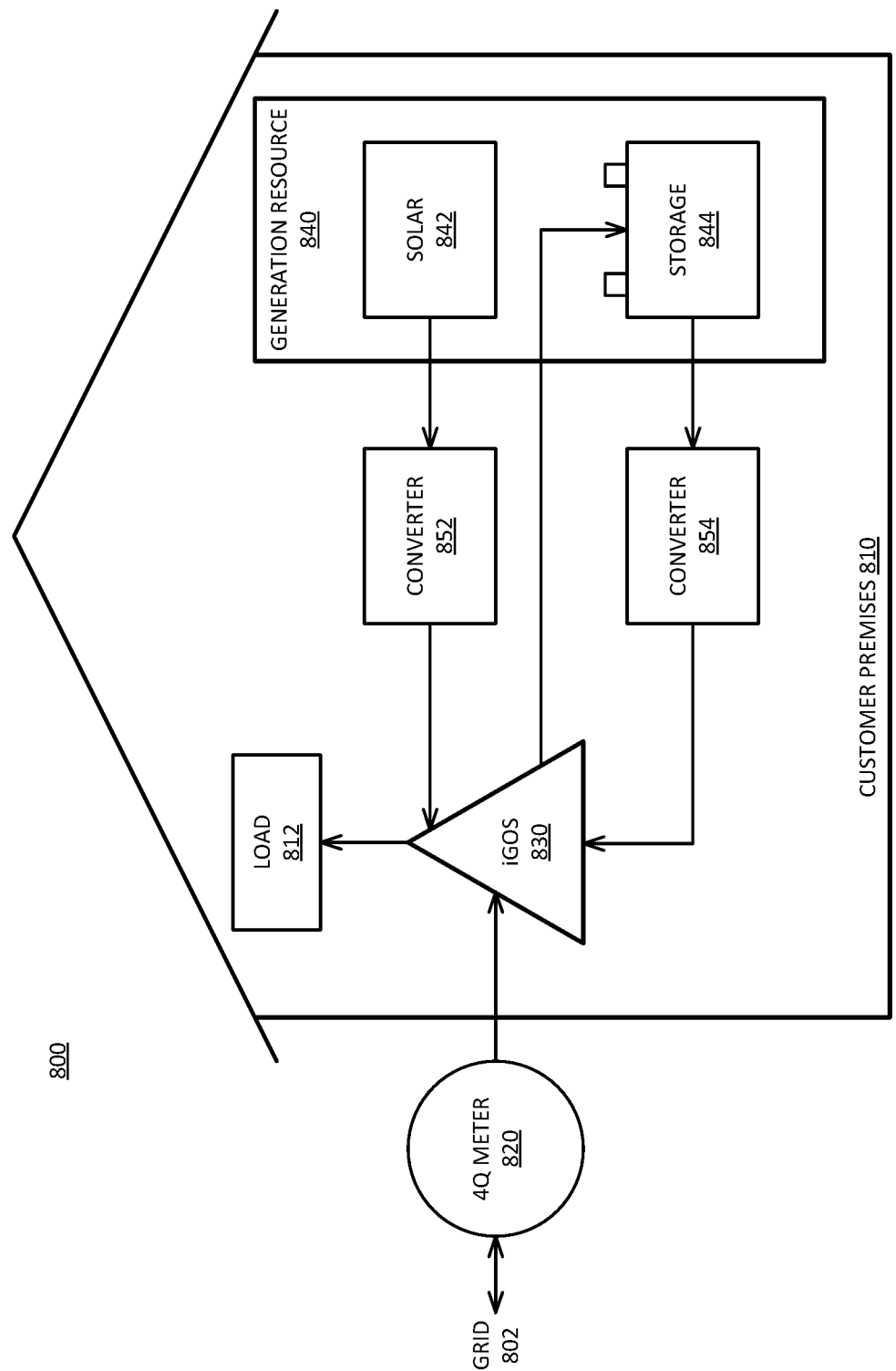
FIG. 8 is a block diagram of an embodiment of a DER node.

FIG. 8 is a block diagram of an embodiment of a DER node. System 800 includes customer premises 810. Customer premises 810 represents a grid consumer, and includes energy generation resources 840. Generation resources 840 can include any type of generator or renewable resource such as solar system 842. In one embodiment, generation resources 840 include storage 844, which can store energy for later retrieval.

Customer premises 810 includes load 812, which can represent one or more individual loads for the premises, or can represent the entire customer premises. Load 812 can have a particular harmonic signature. In one embodiment, customer premises 810 includes iGOS 830, which represents an intelligent platform for energy management of energy generated and consumed at customer premises 810. iGOS 830 can be in accordance with any embodiment described herein. In one embodiment, customer premises 810 interfaces with grid 802 via meter 820. In one embodiment, meter 820 is a four quadrant meter. As a four quadrant meter, meter 820 can indicate not only the quantity of real and reactive power, but in what quadrant the operation currently is. More details regarding the four quadrant meter operation are provided below with respect to FIG. 11.

In one embodiment, solar 842 provides its power for available use by load 812 or to export to grid 802 via converter 852. Converter 852 represents a microinverter that can provide on-demand reactive power from a real power source. Thus, while solar 842 outputs DC power, converter 852 can provide AC output with any phase between the output voltage and current, by driving the current based on a reference waveform, and allowing the voltage to follow the current. Converter 852 has electrical isolation between the input and output, and the electrical isolation allows the device to impedance match both input and output by simply transferring energy between the input and output, instead of regulating a specific voltage or current. Converter 854 can be the same as converter 852, and provides a power interface to storage 844. In one embodiment, storage 844 will include a separate converter to provide DC power to charge the battery.

Customer premises 810 illustrates three components of an intelligent platform for energy management. The first is iGOS 830 to monitor, analyze, and regulate fluctuations of energy use. The next is a converter to manage and modulate voltages and frequencies, and communicate the information multilaterally to consumers, grid operators, and utilities. The converters are capable of reactive power generation, as has previously been stated. The third includes meter 820 and iGOS 830 to perform data collection to aggregate all information from multiple sources in order to increase overall system intelligence and reliability. In one embodiment, the overall aggregated information occurs only at the control center. When operating together, system 800 can provide the smartest energy decisions for the end-user at any given time, whether it is to increase renewable energy generation, reduce energy consumption, delay use of grid-delivered energy, sell excess energy to the grid, or other decision, or any combination of decisions.

Figure 9:
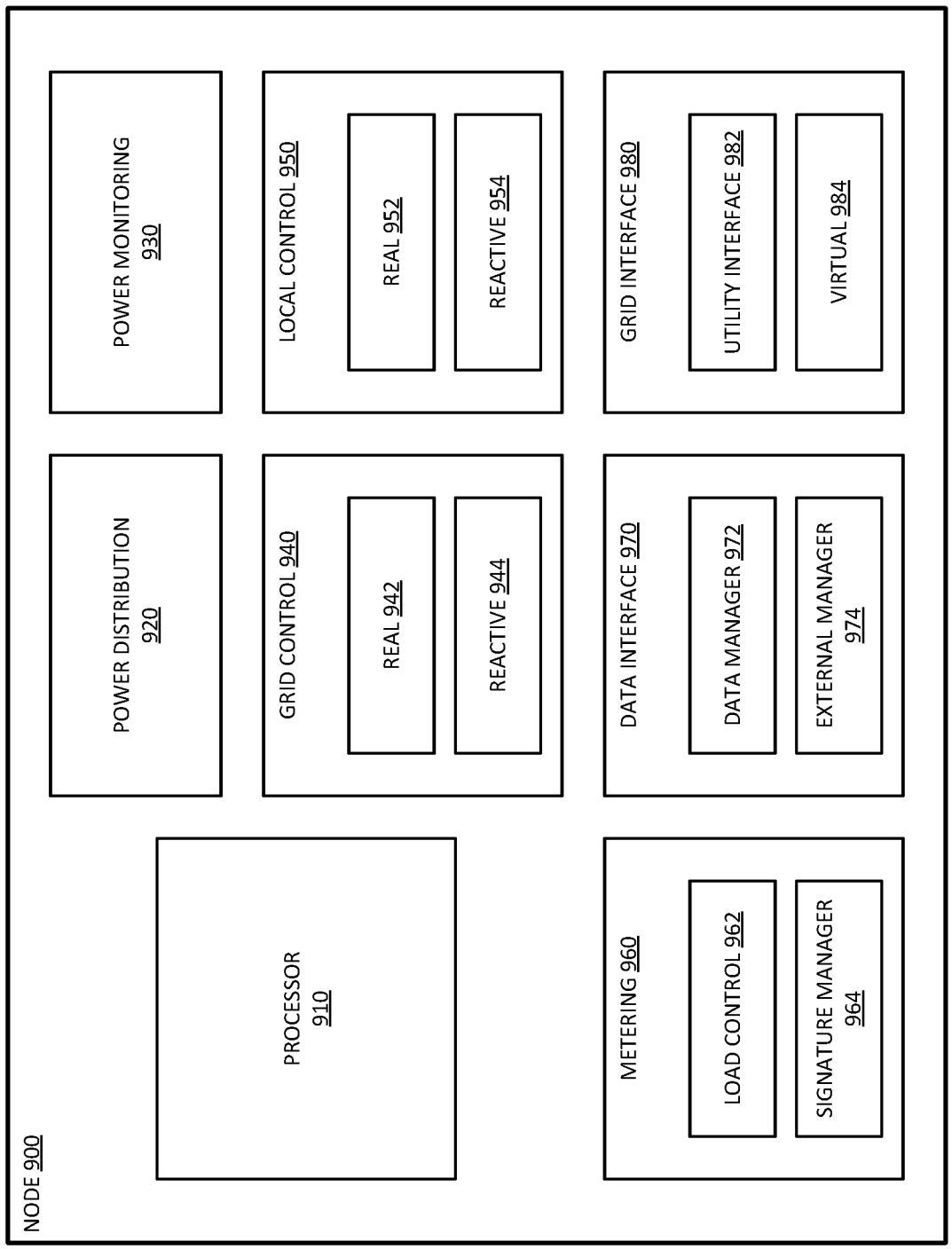
FIG. 9 is a block diagram of an embodiment of a DER node for a distributed power grid.

FIG. 9 is a block diagram of an embodiment of a DER node for a distributed power grid. Node 900 represents a DER node, and can be an example of a DER node or control node in accordance with any embodiment described herein. Node 900 includes various hardware elements to enable its operation. In general, the hardware can be described as processor 910, power distribution hardware 920, and power monitoring hardware 930. Each of these elements can include specific types and functionality of hardware, some of which can be represented by other elements of FIG. 9.

Processor 910 represents one or more controllers or processors within node 900. In one embodiment, node 900 includes a power meter, a power converter, and control hardware to interface the two elements and couple to the grid. In one embodiment, each separate item includes a controller, such as a controller within the metering device, and a controller within the power converter. The power converter can include a power extractor controller, an inverter controller, and another controller to manage them. Thus, controller 910 can represent multiple controllers or elements of control logic that enables node 900 to monitor and distribute power.

Processor 910 manages and controls the operation of hardware within node 900, including any hardware mentioned above. Processor 910 can execute to provide iGOS for node 900. In one embodiment, processor 910 executes logic to provide at least some of the functions described with respect to node 910. To the extent that functions described are provided by hardware, processor 910 can be considered a controller to control the operation of the hardware. In one embodiment, processor 910 executes a DER node operating system for node 900. In one embodiment, the operating system is iGOS.

The iGOS platform can provide computing, and general control over the operation of node 900. In one embodiment, iGOS enables the node to collect data and make decisions to send data outside the node. In one embodiment, iGOS can use the data to control the local system, such as the local elements coupled to a same side of a PCC. In one embodiment, iGOS also sends data for use by external entities, such as a utility manager or other nodes in the grid network.

In one embodiment, iGOS controls dispatch functionality for node 900. The dispatching can include providing and receiving data and especially alerts used to determine how to distribute power. In one embodiment, the iGOS can enable autonomous dispatching, which allows the nodes of the grid network to share information among themselves that control the operation of the grid. The autonomous dispatching refers to the fact that a central grid operator does not need to be involved in generating or distributing the dispatch information.

In one embodiment, iGOS enables control functionality. The control can be by human, cloud, or automated control logic. In one embodiment, the iGOS enables node 900 to work independently as an individual node or work in aggregate with other DER nodes in a grid network. The independent operation of each can enable the distributed network to function without a central power plant, or with minimal central grid management.

In one embodiment, the iGOS can enable blackstart operation. Blackstart operation is where node 900 can bring its segment of the grid back up online from an offline state. Such operation can occur autonomously from central grid management, such as by each node 900 of a grid network independently monitoring conditions upstream and downstream in the grid network. Thus, node 900 can come online when conditions permit, without having to wait for a grid operator to control distribution of power down to the node. Node 900 can thus intelligently bring its node segment back up online by controlling flow of power to and from the grid, and can thus, prevent startup issues. In one embodiment, iGOS enables virtual non-export operation. Non-export includes not outputting power onto the grid. However, with the iGOS, node 900 can convert real power to reactive power, and continue to export power, but not of a type requested by the grid, instead of simply dumping watts onto the grid.

In one embodiment, the iGOS enables node 900 to offer multiple line voltages. In one embodiment, grid interface 980, which may be through control logic of processor 910, can be configured for multiple different trip point voltages. Each trip point voltage can provide a different control event. Each control event can cause processor 910 to perform control operations to adjust an interface of the DER node. The interface can be an interface to a load and/or an interface to the grid network.

In one embodiment, the iGOS can economize interconnects within the grid network. In one embodiment, node 900 controls backflow (e.g., through non-export) onto the grid network by limiting the backflow, or adjusting output to change a type of power presented to the grid. In one embodiment, node 900 provides utility control functions that are traditionally performed by utility grid management that controls flow of power from a central power plant. Node 900 can provide the grid control functions to enable a distributed power grid.

Power distribution hardware 920 includes power lines, connectors, phase locked loops, error correction loops, interface protection or isolation such as transformers, or other hardware or a combination that enables the DER node to transfer energy from one point to another, to control interfaces to control how power flows throughout the grid, or other operations. In one embodiment, a power converter can be included within the power distribution hardware. A power converter can be a smart inverter or microinverter.

Power monitoring hardware 930 includes connectors, signal lines, sampling hardware, feedback loops, computation hardware, or other hardware that enables the DER node to monitor one or more grid conditions or load conditions or both. The grid conditions can be or include voltage levels, phases, frequencies, and other parameters of the grid operation. The load conditions can be or include voltage, current, phase, frequency, and other parameters of power demand from loads.

In one embodiment, node 900 includes grid control 940. Grid control represents hardware and logic (e.g., such as software/firmware logic, configurations) to control an interface to the grid network. In one embodiment, grid interface 980 represents grid network interfaces. Grid control 940 can include real power control 942 and reactive power control 944. The real and reactive control can be in accordance with any embodiment described herein. In one embodiment, real power control 942 includes logic (hardware or software or a combination of hardware and software) to provide real power to the grid. In one embodiment, reactive power control 944 includes logic to provide reactive power to the grid. Providing power to the grid can include changing an interface to cause power of the type and mix desired to flow to the grid.

In one embodiment, node 900 includes local control 950. Local control represents hardware and logic (e.g., such as software/firmware logic, configurations) to control an interface to the load or to items downstream from a PCC coupled to a grid network. Local control 950 can include real power control 952 and reactive power control 954. The real and reactive control can be in accordance with any embodiment described herein. In one embodiment, real power control 952 includes logic (hardware or software or a combination of hardware and software) to provide real power to a load. In one embodiment, reactive power control 954 includes logic to provide reactive power to a load. Providing power to the load can include changing an interface to cause power of the type and mix desired to flow to the load from a local energy source and/or from the grid.

It will be understood that a utility power grid has rate structures that are based on not just the amount of use, but the time of use. For example, a utility grid can have tiered rates. In one embodiment, processor 910 includes rate structure information that enables it to factor in rate structure information when making calculations about how to change an interface with grid control 940 or with local control 950. Factoring in rate structure information can include determining what type of power (real or reactive) has more value in a given circumstance. Thus, processor 910 can maximize value of energy production or minimize the cost of energy consumption. In an implementation where tiered rate structures exist, processor 910 can instruct grid control 940 or local control 950 based on how to keep consumption to the lowest tier possible, and how to provide power at a highest rate possible. In one embodiment, processor 910 takes into account utility or grid network requirements when controlling the operation of grid control 940 or local control 950. For example, the grid may have curtailments or other conditions that affect how power should be provided or consumed. In one embodiment, node 900 can adjust power output as loads dynamically come online and offline. For example, local control 950 can reduce output when loads go offline, and can increase output when load come online.

Metering 960 represents metering capability of node 900, and can include a meter in accordance with any embodiment described herein. In one embodiment, metering 960 can include load control metering 962. Load control 962 can include logic to monitor load power demand. In one embodiment, metering 960 can include signature manager 964. Signature manager 964 includes logic to create, store, and use energy signatures in monitoring what is happening with loads. More specifically, signature manager 964 can manage energy signatures including complex current vectors in accordance with any embodiment described herein.

Traditionally, a net energy meter was required to connect to the grid. However, newer regulations may prevent connecting to the grid at all unless certain capabilities are met. Metering 960 can enable node 900 to control an inverter or converter to respond to specific loads or to specific energy signatures identified on the line. Based on what metering 960 detects, node 900 can provide realtime control over energy production and load consumption.

In one embodiment, node 900 includes data interface 970. In one embodiment, data interface 970 includes data manager 972 to control data that will be sent to a data center or data management, and data that is received from the data center or data management. Data manager 972 can gather data by making a request to a data center or comparable source of data. In one embodiment, data interface 970 includes external manager 974, which can manage the interface with a data center, central grid management, other nodes in the grid network, or other data sources. In one embodiment, data manager 972 receives data in response to data sent from a data source. In one embodiment, external manager 974 makes a request for data from a data source. The request can be in accordance with any of a number of standard communication protocols or proprietary protocols. The medium for communication can be any medium that communicatively couple node 900 and the data source. In one embodiment, external manager 974 communicates with a data source at regular intervals. In one embodiment, external manager 974 communicates with the data source in response to an event, such as more data becoming available, whether receiving indication of external data becoming available, or whether data manager 972 indicates that local data is ready to send. Data interface 970 can enable realtime data for market use. In one embodiment, data interface 970 provides data collection, which can be used in one embodiment to identify currents for energy signatures.

In one embodiment, node 900 includes grid interface 980. In one embodiment, grid interface 980 includes utility interface 982 to interface with a utility grid. In one embodiment, grid interface 980 includes virtual interface 984 to interface with a distributed grid network. The operation of the grid interface can be referred to as MGI (modern grid intelligence), referring to execution of an MGIOS by processor 910. Grid interface 980 can include any type of interface that couples node 900 to grid infrastructure, whether traditional utility grid infrastructure or distributed grid networks. In one embodiment, grid interface 980 can enable node 900 to know a power direction. In one embodiment, the grid network provides dispatch information, such as provide a signal from a feeder to indicate a power direction. Node 900 can manage its operation based on the direction of power flow in the grid network. Grid interface 980 can also dynamically monitor changes in direction of power flow.

In one embodiment, the iGOS enables node 900 to adjust operation of one or more elements connected downstream from a PCC, to scale back operation of the grid. Consider an example of air conditioners coupled downstream from a PCC. In one embodiment, the iGOS can detect that the grid network is experiencing heavy load, and can determine to slow down all air conditioners to relieve the grid for 5 to 10 minutes. Thus, the devices do not need to be stopped, and the grid does not need to shut off power to any segment. Instead, the power can be reduced for a period of time to selected loads to allow the grid can recover itself. Thus, the iGOS can control the load or the sources. Such operation can reduce or prevent brownouts or rolling blackouts, for example, by scaling power demand back instead of completely shutting supply down.

It will be understood that node 900 requires a certain amount of power to operate. The power consumed by node 900 can be referred to as tare loss, which indicates how much power the controlling devices consume when the node is not generating power. In one embodiment, node 900 includes a sleep feature to reduce tare loss. For example, a node that controls a metastable energy source such as solar can sleep when there is no sun, and can wake up when the sun comes up. In one embodiment, the node can default to a low power state and awake in response to a signal from a solar detector, power over Ethernet, or some other external signal trigger to wake it up. In one embodiment, a node can wake up during a sleep cycle at night to perform upgrades or perform other ancillary services.

Figure 10:
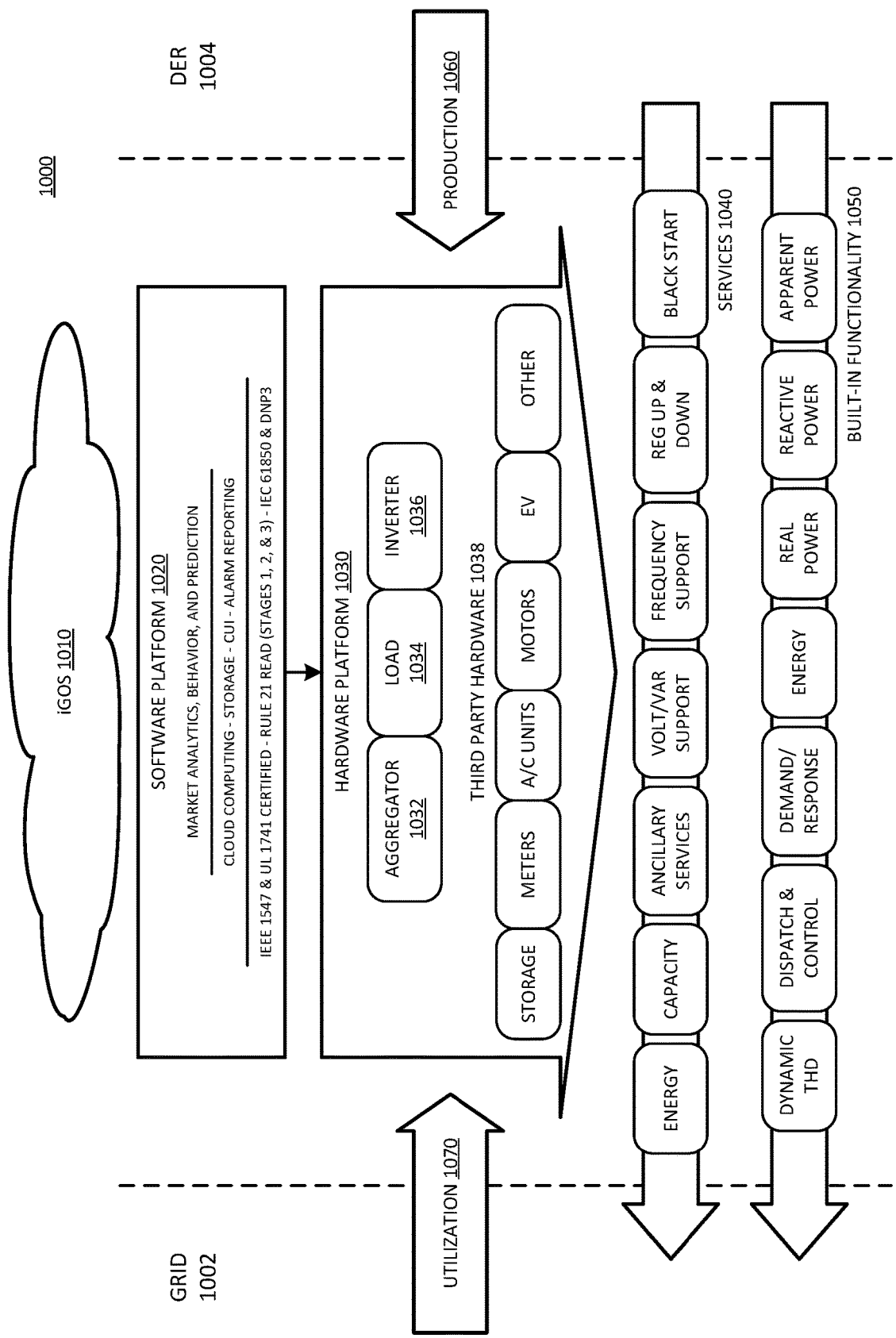
FIG. 10 is a block diagram of an embodiment of an intelligent grid operating system.

FIG. 10 is a block diagram of an embodiment of an intelligent grid operating system. System 1000 represents a grid network system in accordance with any embodiment described herein. In one embodiment, iGOS 1010 is implemented in DER 1004. In one embodiment, iGOS 1010 is implemented in a control center that communicates with intelligence in DER 1004. System 1000 includes grid 1002, which represents a utility grid that allows DER aggregation.

iGOS 1010 executes software platform 1020, which can include features and services such as market analytics, behavior monitoring and learning, and prediction. In one embodiment, iGOS 1010 includes cloud computing resources. In one embodiment, the system stores and analyzes historical data, and can report alarms. The system provides a user interface for operation, such as a command user interface that enables the execution of various command functions for associated DERs 1004. In one embodiment, iGOS 1010 includes software that complies with industry standards, such as UL safety standards, DER aggregation standards, or communication protocols.

The iGOS platform does more than create power. It also provides necessary management functions built right in. In one embodiment, iGOS 1010 can be envisioned as having cloud connection and aggregation, software layer(s) of platform 1020, and hardware association or control through hardware platform 1030. The software and hardware can provide the delivery of services, as well as built-in functionality. In one embodiment, iGOS includes realtime, on demand data and control for: 1. energy management; 2. real-time dispatch and control; 3. revenue grade metering and billing; 4. prediction, modeling, forecasting, and historical data; and, 5. secure node networking with DNP3 and IEEC 61850.

In one embodiment, hardware platform 1030 includes aggregator 1032 to aggregate information from multiple sources, and potentially from multiple DERs. In one embodiment, hardware platform 1030 can be considered to include load 1034, which represents loads within a managed consumer premises. It will be understood that a load is a dynamic concept, as a user will continually turn loads on and off throughout the day. Hardware platform 1030 includes inverter 1036, which represents a microinverter or power converter in accordance with any embodiment described herein. iGOS 1010 can control the functions of the hardware elements of hardware platform 1030. In one embodiment, hardware platform 1030 can also integrate the function of third party hardware resources 1038, such as storage, meters, air conditioning units, motors, electric vehicles, or other hardware.

In one embodiment, iGOS 1010 factors utilization 1070 of the grid and of the local hardware resources. In one embodiment, iGOS 1010 factors production 1060 of energy by DER 1004 to determine what actions to take, and what services can be provided to grid 1002. iGOS 1010 can provide any one or a combination of services 1040, such as energy, capacity, ancillary services, volt/VAR support, frequency support, regulation up and down, or blackstart. In addition to services, iGOS 1010 includes built-in functionality 1050, such as dynamic total harmonic distortion (THD) control to remove harmonics by adjusting operation relative to an idealized reference waveform, dispatch and control, demand/response, energy output and control, real power output and control, reactive power output and control, apparent power output and control, or non-export.

In one embodiment, iGOS 1010 can service loads at the highest load factor, while dynamically exchanging information with energy resources, such as the utility, ISO dispatched generators, renewable resources, and on site storage. In one embodiment, the software can include the operating system implementation at the node, where multiple nodes are connected via the cloud. Further built-in functionality can include dispatchable control over all aspects of energy production and consumption.

Figure 11:
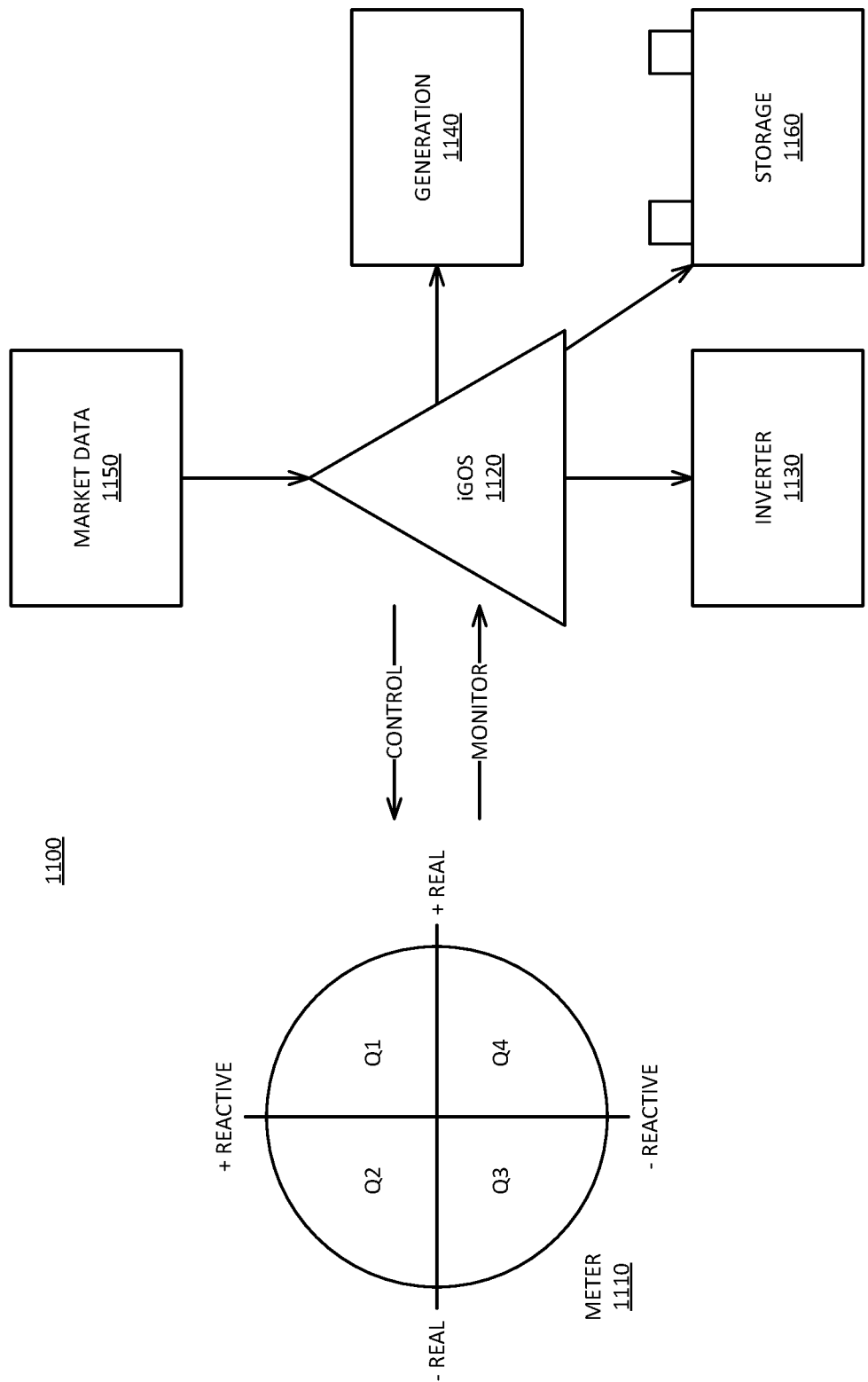
FIG. 11 is a block diagram of an embodiment of a four quadrant meter with an intelligent grid operating system.

FIG. 11 is a block diagram of an embodiment of a four quadrant meter with an intelligent grid operating system. System 1100 represents a four quadrant meter system. System 1100 includes meter 1110, which can communicate with iGOS 1120. Meter 1110 reads data out to monitor system 1100, which readings it can provide to iGOS 1120. In one embodiment, iGOS 1120 can provide control commands or communication to meter 1110.

The elements of system 1100 include iGOS 1120, inverter 1130, generation 1140, and storage 1160 can be in accordance with any embodiment described herein. Market data 1150 represents information obtained from an external source to determine what market demand and market prices exist. In one embodiment, market data 1150 represents a realtime stream of information from one or more sources. As before, generation 1140 represents the ability to generate energy, and storage 1160 represents storage capacity. Inverter 1130 represents a power converter that enables the realtime generation of reactive power and apparent power, and enables reactive power injection into a coupling node monitored by meter 1110.

Regarding meter 1110, real power is represented on the x-axis, and reactive power is represented by they-axis, with positive and negative power directions indicated. Positive power is energy from the grid, and negative energy is power generated locally at the consumer premises or DER. Depending on the quadrant (1, 2, 3, or 4), iGOS 1120 can control operation of the system at the DER. In one embodiment, iGOS 1120 dynamically changes the local output (by adjusting real power generation 1140, reactive power generation through inverter 1130, or both) to adjust the current quadrant of operation. The quadrant is where the apparent power is. Basically, the meter puts apparent power on a unit circle. In one embodiment, iGOS 1120 executes based on market data 1150, and which quadrant the apparent power is in. Generation 1140, inverter control 1130, and storage 1160 can all be controlled based on the market and quadrant location. The differences in market price and peak demand can affect the operation to move apparent power into the most valuable quadrant. In one embodiment, the system can couple harmonic control with the four quadrant information.

In one embodiment, the DER of system 1100 may be operating in one quadrant, and based on market data 1150, iGOS 1120 determines that it would be more valuable to more to a different quadrant. iGOS 1120 can provide control signals to adjust the operation of inverter 1130 to change power generation output to move the apparent power into a different quadrant. For example, moving from quadrant 4 to quadrant 1 can involve ceasing to generate reactive power. Then real and reactive power would come from the grid. Alternatively, moving from quadrant 2 to quadrant 3 would involve continuing to export real power, but also generating more reactive power to move quadrants. Meter 1110 can identify a quadrant of operation based on a direction of the flow of energy, and can thus determine quadrants based on inflow or outflow of both real power and reactive power. System 1100 can adjust the quadrant of operation based on market data, based on local demand (e.g., based on loads, not specifically shown), based on a dispatch or control signal from a control center or from grid control, or for a combination of these.

Figure 12A:
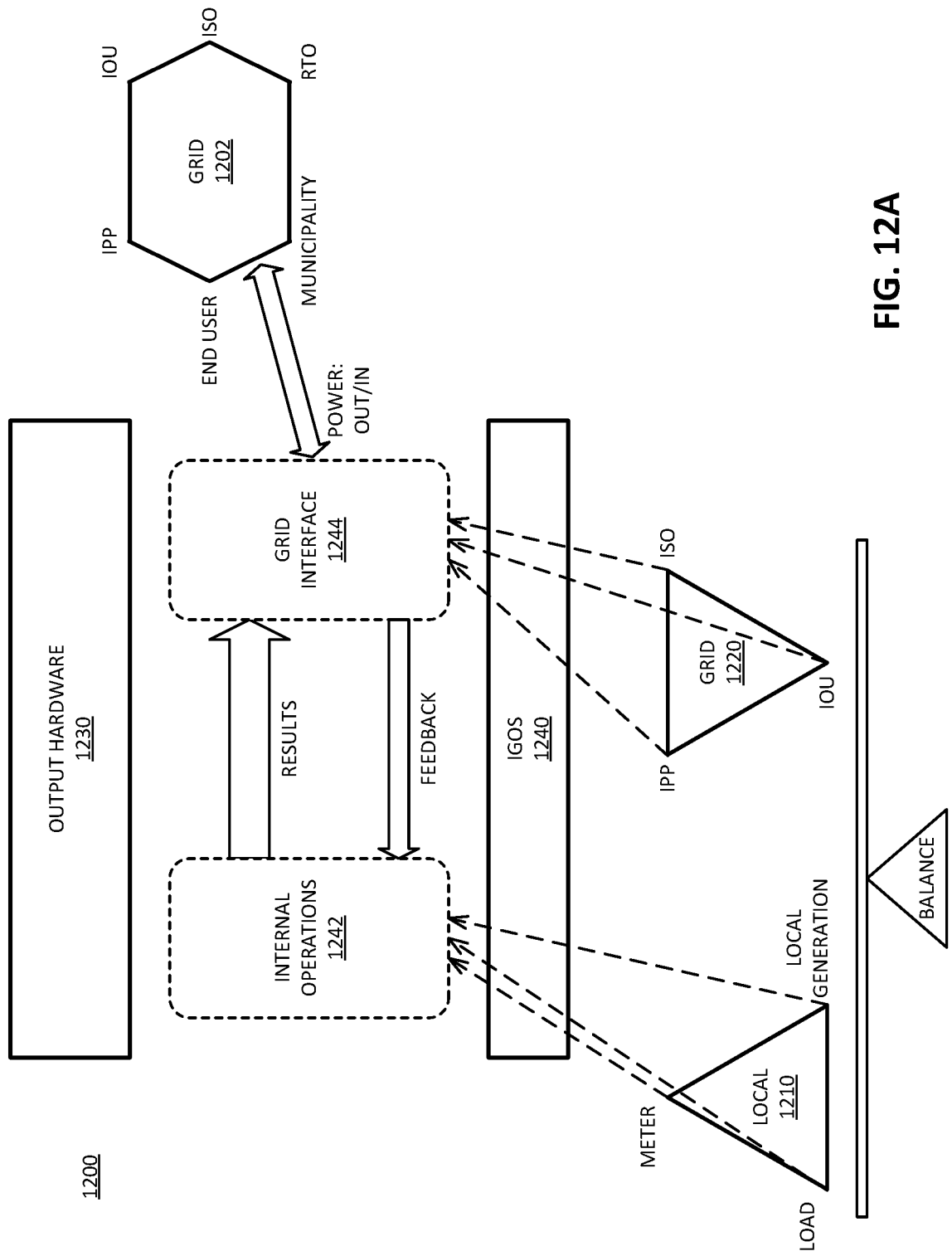
FIG. 12A is a block diagram of an embodiment of an intelligent grid operating system managing grid interconnect of a DER node.

FIG. 12A is a block diagram of an embodiment of an intelligent grid operating system managing grid interconnect of a DER node. System 1200 represents elements of an iGOS system. System 1200 includes local information 1210, which can be information from local loads, local metering, and local energy generation. Based on this information in realtime, system 1200 can determine what capabilities the DER system has, and where it can operate with respect to a meter quadrant.

iGOS 1240 represents the iGOS system in accordance with any embodiment described herein. iGOS 1240 controls output hardware 1230 to control the operation of the DER. Internal operations 1242 represent the internal operations determined by iGOS 1240 based on local information 1210. For example, based on availability of local energy generation, and a demand from local loads, iGOS 1240 may determine how to operate to satisfy the local demands. When local generation is more than local demand, iGOS 1240 can identify the excess through the metering. Internal operations 1242 can also include metering to determine efficiency of internal operations.

In one embodiment, iGOS 1240 also factors in grid interface 1244. Internal operations 1242 represent the energy state and management for local load and generation. Grid interface 1244, in contrast, represents how the interface with the grid is perceived by the grid. Internal operation 1242 can be thought of as "inside the meter," and grid interface 1244 represents what is presented to the grid "at the meter," or looking in from the other side of the meter. There are many scenarios where what might make the most sense for internal operations 1242 is different from what is the best operation when factoring and balancing grid interface 1244. The balance can include information from IPPs, ISOs, IOUs, or other grid information 1220. Grid information 1220 represents what is happening at the grid from an operational standpoint (e.g., what is the power factor at the point of connection), as well as from a market standpoint (for example, what market demands currently exist for services). Based on the grid and the energy markets, iGOS 1240 can cause output hardware 1230 to adjust operation to present a different interface to the grid.

In one embodiment, the results of the internal operations as provided through output hardware 1230 responsive to control from iGOS 1240 is the basis of what grid interface will be. Based on grid information 1220, iGOS 1240 can adjust the internal operations, which appears to then generate different results responsive to grid interface feedback. Grid interface 1244 provide power in and power out to grid 1202. Grid 1202 includes IPPs, IOUs, ISOs, RTOs, end users, and municipalities. iGOS 1240 can balance the needs of the grid with the capabilities and services available locally from the DER.

Thus, it will be understood that there is an overlap of energy metering, load demand, and on-site energy generation. These components can be related in a triangle, as there is a relationship between load needs and on-site generation and energy metering. Such consumer-end demand, energy generation, and metering can be balanced within a grid ecosystem of grid 1202, which is informed by the other triangle with IPP, RTO, and IOU. While the triangles are illustrated as balancing against each other, it will be understood that the grid ecosystem of system 1200 includes components other than just IPP, RTO, and IOU, and load, on-site generation, and metering. Other components can include the end-user, such as the behavior of the user in addition to the consumer-end equipment illustrated on the other side. Also, municipalities and other regulatory organizations. In addition to these, the independent service operators (ISO) also factor into the environment. As described herein, the iGOS system can manage the balance for the consumer-end hardware in the grid ecosystem.

Figure 12B:
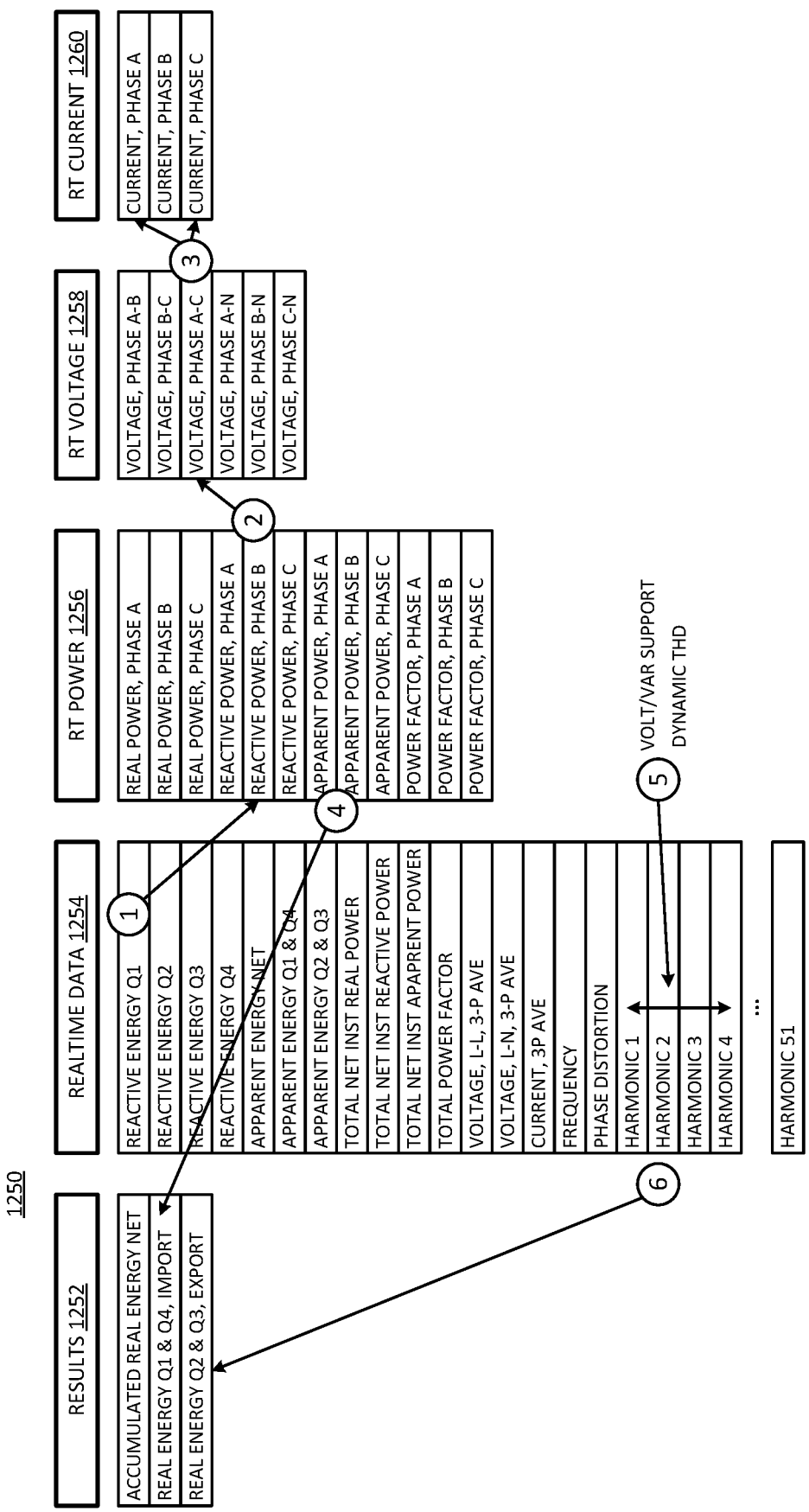
FIG. 12B is an embodiment of table data to illustrate grid interconnect management for a DER node.

FIG. 12B is an embodiment of table data to illustrate grid interconnect management for a DER node. Table 1250 provides an example of a flow based on realtime monitoring and control. Consider that the categories of results 1252, realtime data 1254, realtime (RT) power 1256, realtime voltage 1258, and realtime current 1260 represent various quantities measured and controlled on a constant basis within a DER by an iGOS system.

Assume for the example that the system, either by design as a result of a control command, or because of some condition on the grid or the sudden appearance of or disappearance of certain loads, realtime data 1254 indicates that there is reactive energy in Q1 (quadrant 1). In one embodiment, the change in reactive power in Q1 at (1) will correspond with a change in reactive power in Phase B (assuming a three-phase system). The Phase B change appears in the realtime power measurements of 1256 at (2). The change in reactive power in Phase B may cause a change in voltage between Phase A and Phase C, as indicated in realtime voltage measurements 1258 at (3). The change in voltage can in turn cause a change in the current of Phase A and the current of Phase C, as illustrated in realtime current measurements 1260 by the arrows.

It will be understood that all these values can be constantly monitored, and thus, detected. In one embodiment, as the current and voltage changes occur, the apparent power in at least one phase will change, as illustrated by realtime power measurements 1256 at (4). In one embodiment, the change in apparent power can cause a real energy change that causes energy to be imported, as shown by the arrow to results 1252.

Based on the measurements, the system can respond and adjust its operation to compensate for the changes. The initial reaction to the changes may occur quite quickly (within a matter of seconds or less), even though it may take a matter of several seconds for the adjustments to have a complete effect. In one embodiment, in response to the import of energy based on the reactive energy change, the system identifies that one or more harmonics are being caused or introduced, as illustrated in realtime data 1254 at (5). In response to the harmonics, the iGOS system can provide volt/VAR support and dynamic THD control to adjust for the distortion. Based on the correction as illustrated at (6), the result can be to compensate and then export real energy as shown in results 1252. Thus, the system can respond in a way opposite the change to adjust for its effects.

Figure 13:
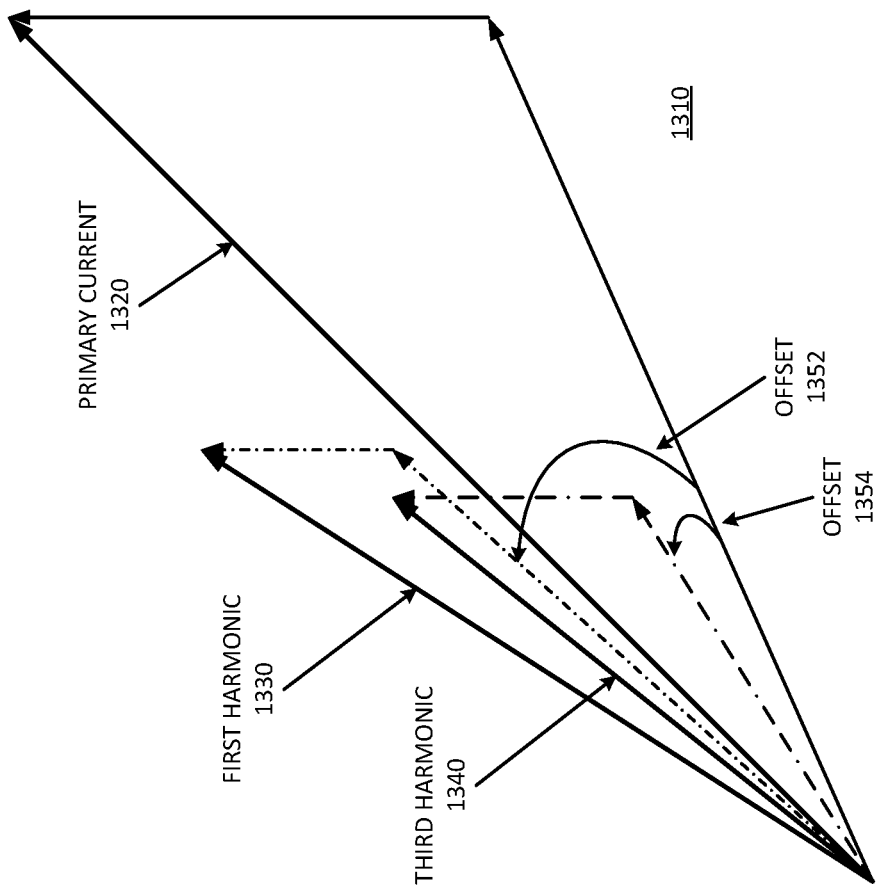
FIG. 13 is a graphical representation of an embodiment of components of a current in a system in which harmonic components of current have angular offsets with respect to a primary current component.

FIG. 13 is a graphical representation of an embodiment of components of a current in a system in which harmonic components of current have angular offsets with respect to a primary current component. Diagram 1310 provides a complex vector representation of current. A vector has a magnitude and a direction. Instead of simply measuring power as traditionally done, in one embodiment, a meter or a DER node can monitor power as an energy signature including a representation of a complex power vector. In one embodiment, each signature identifies characteristics to define or "name" the signature. Each signature includes a complex vector representation that provides a vector for primary current and a vector for one or more harmonics.

Vector 1320 is the vector for primary current. In typical representation, the x-coordinate is the vector component that extends from left to right across the page. The y-component goes from bottom to top of the page. It will be understood that while not represented here for purposes of simplicity, a vector could have a negative y-component. The x-y coordinates define the end of the vector. Now assume that the x and y coordinates of primary current vector 1320 define a plane. The most correct way to envision the harmonics, in accordance with research and work done by the inventors, is to represent the harmonics as a three-dimensional vector. Thus, if the x-y coordinates of vector 1320 define a reference plane, one or more of the harmonics can have an angular offset relative to the plane of the primary current vector.

For example, consider the example of diagram 1310. The first harmonic is illustrated as having vector 1330, which includes an x component and a y component, where the magnitudes of the components can be any magnitude with respect to the primary current components. In addition to the x and y coordinates, first harmonic vector 430 includes a z coordinate component, which defines angular offset 1352 of the vector with respect to the reference plane of primary current vector 1320. It will be understood that the starting points of the primary current and the harmonics are the same. Thus, the third dimension of the harmonic vectors or the complex vectors is not necessarily an absolute z coordinate component, but an angular offset relative to the primary current.

As illustrated, third harmonic vector 440 also has an x component and a y component, and angular offset 1354, which can be different (greater or less than) angular offset 1352 of first harmonic vector 1330. The angular shift of the angular offsets represents a magnetic effect on the current. The inventors have measured noticeable effects on power consumption up to the fortieth harmonic. Thus, the contribution of harmonic offsets should not be understated. The harmonics shift with respect to the angular offset due to the differing resonant effects of magnetic flux when trying to move a current. Primary current vector 1320 is the current the consumer expects to see. However, the harmonic components can add significant (measurable) power consumption. The offsets of the harmonics can shift the simple expected two-dimensional current vector into a three-dimensional current vector (complex current vector). The traditional power triangle does not fully address the power usage by the consumer, as additional power will be required to overcome the magnetic components represented by the shifted or offset harmonic components.

Figure 14:
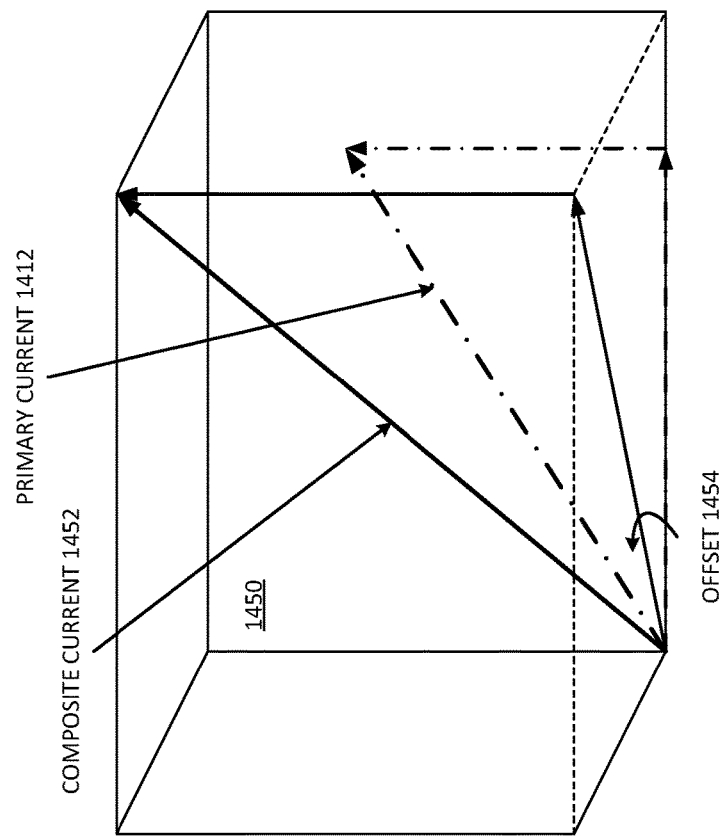
FIG. 14 is a graphical representation of an embodiment of components of a current in a system in which a current vector is a composite of a primary current component and harmonic current components.
Figure 14:
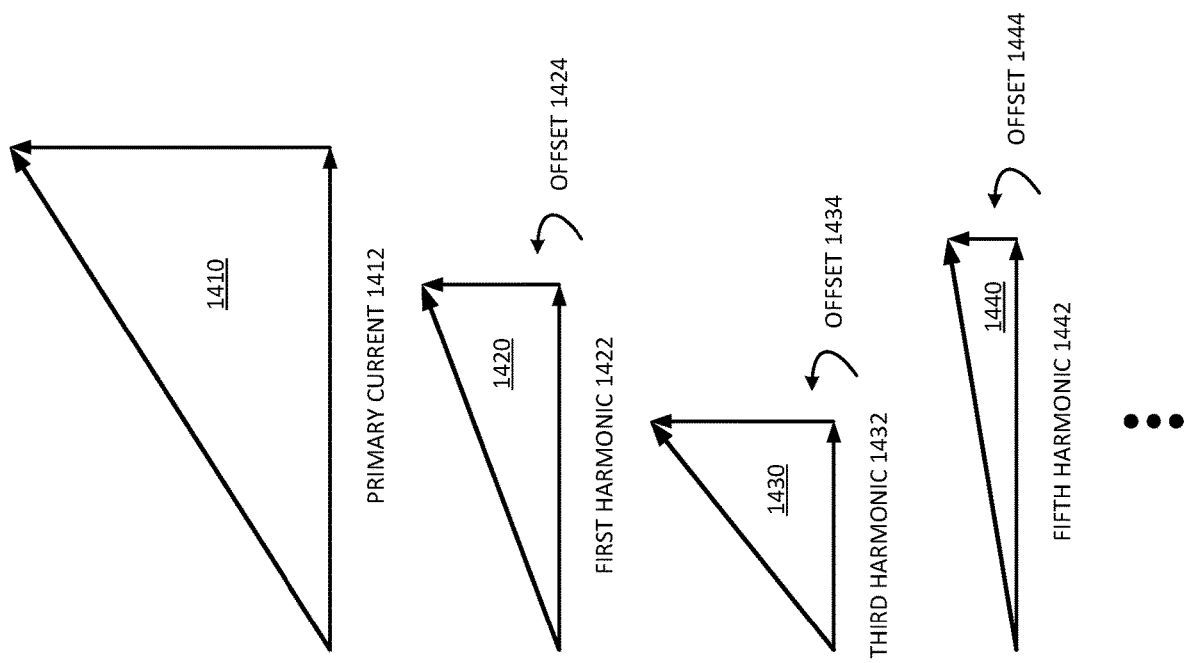

FIG. 14 is a graphical representation of an embodiment of components of a current in a system in which a current vector is a composite of a primary current component and harmonic current components. Diagrams 1410, 1420, 1430, and 1440 illustrate component parts of a complex current vector in accordance with an embodiment of diagram 1310 of FIG. 13. As illustrated, diagram 1410 represents the primary current vector 1412. The primary current includes x and y components, and defines a reference frame for the harmonics.

Diagram 1420 represents first harmonic vector 1422, which includes x and y components and angular offset 1424. Diagram 1430 represents third harmonic vector 1432, which includes x and y components and angular offset 1434. Diagram 1440 represents fifth harmonic vector 1442, which includes x and y components and angular offset 1444. Each of the primary current 1412 and various harmonics (1422, 1432, 1442) are shown as two-dimensional "power triangle" representations, which is what is traditionally expected for each one. However, as mentioned already, the harmonics are frequently at an angular offset with respect to the primary current component vector, and thus the resulting composite current vector will not be in the same plane as primary current vector 1412.

Rather, consider the power triangle of the composite current vector as a triangle in a three dimensional box. Diagram 1450 provides a simple illustration of this concept. It will be observed that primary current vector 1412 is on a face of the three dimensional box of diagram 1450. The harmonics push the triangle for the composite current "into" the box in some way. Composite current vector 1452 is both larger in magnitude, and offset angularly with respect to primary current vector 1412. Offset 1454 represents the angular offset. It will be understood that primary current vector 1412 and composite current vector 1452 define the "shape" of the box. Depending on the amount of harmonic contribution, the box shape will be different. The composite current vector 1452 can be a signature stored by the metering device. The reference plane of primary current 1412 can be defined as a plane of the grid power (referring to the power condition as seen at the grid via the PCC.

With respect to the noise and harmonics generated, it will be understood that there are regulations on switching power supplies and magnetic resonance in general. Each device is tested for compliance (e.g., UL certification). When each device or load works individually as designed and tested, each one will comply as required per regulations. However, when there are multiple loads or devices coupled together, they tend to create unanticipated resonance. The inventors have measured contributions to the energy triangle from the first up to the 51st harmonic. Thus, there is typically a significant amount of harmonic noise happening on the power lines. Harmonic suppression traditionally includes filters that target specific noise components. However, the noise components can continue to vary as different devices come online and offline, and the electrical resonance structure of the network continually changes. In one embodiment, a meter detects the characteristics of each load or group of loads. The characteristics can be referred to as a signature of the harmonics.

In one embodiment, the power meter or energy meter can detect such shifts as the angular offsets of the harmonic current vectors, by measuring energy contributions. The power converter can compensate for the actual composite current by providing the reactive power needed to match the load or PCC to the grid. Thus, the current at the load can be adjusted by the converter to bring the composite current into alignment with the grid, not simply in power factor, but in complex vector. Such operation will naturally eliminate or at least reduce harmonic distortion caused by loading on the grid.

In one embodiment, what is described in reference to loading can also be performed with reference to energy generation. In one embodiment, the meter can determine an energy signature at the PCC and compute what current would be needed to offset the grid to a desired offset (if some power factor other than unity is desired) or to match to the grid in a case where unity power factor is desired. The converter can adjust operation to adjust the power output to not only match reactive power needs, but complex current vector shift as well to more efficiently match the interface of the grid with the downstream from the PCC.

It will be understood that the energy triangle represented in diagram 550 can be represented as a mathematical representation of the effect seen when looking at the current component of power drawn by a load or consumer. The effect is wasted energy, which usually manifests itself as heat. The problem traditionally is that systems do not match well, and there are significant noise components. In one embodiment, a DER node matches not just impedance, but matches noise or harmonic correction to provide a specific energy signature connection to the grid. Thus, the DER node can provide a "cleaner" connection to the grid network with respect to the power interface, whether outputting power onto the grid or receiving power from the grid.

Figure 15:
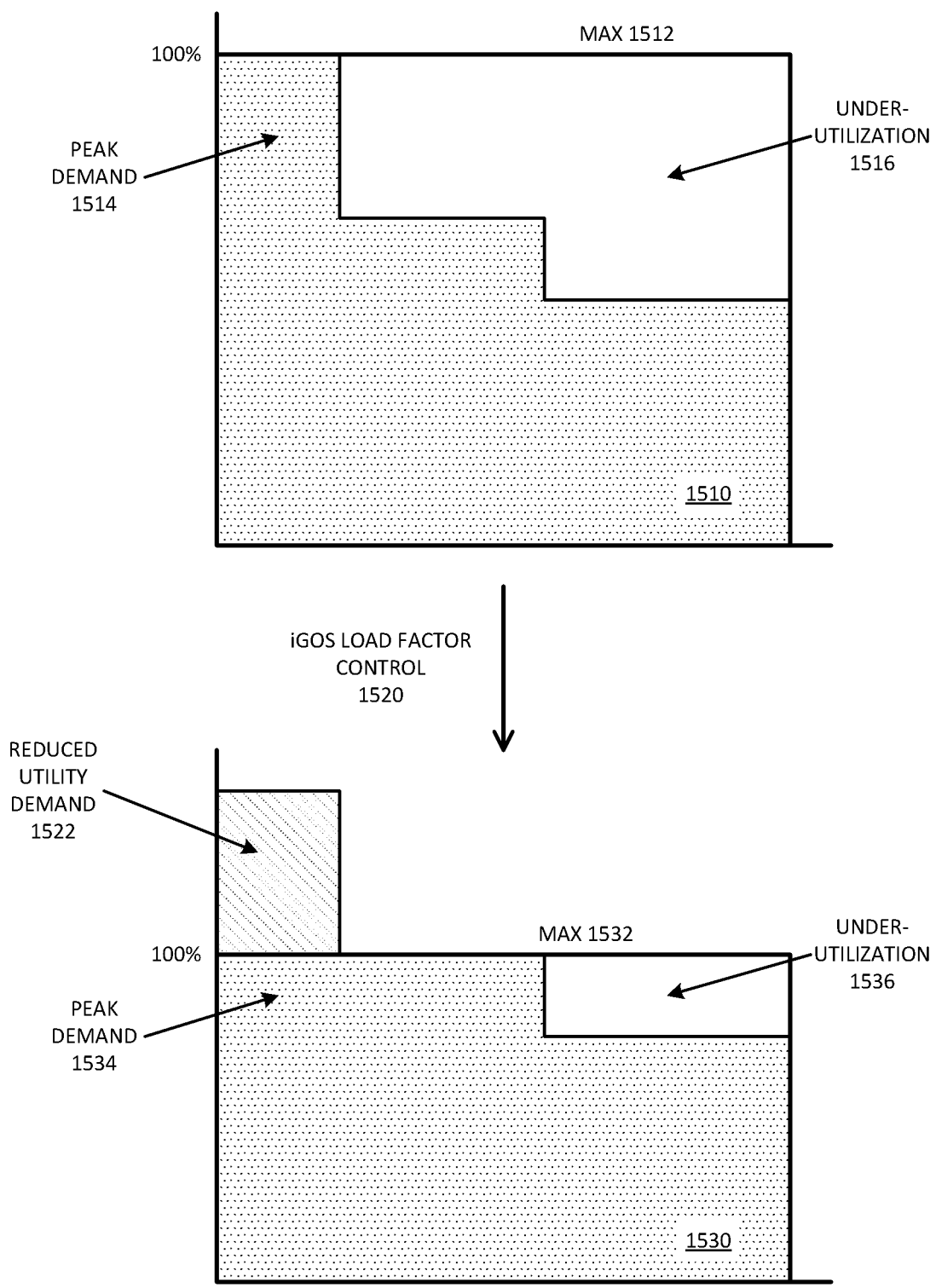
FIG. 15 is a block diagram of an embodiment of load factor control.

FIG. 15 is a block diagram of an embodiment of load factor control. It will be understood that traditional pricing for a consumer is based on peak demand, as illustrated by the 100% mark in diagrams 1510 and 1530. The user pays rates for the availability of the peak demand, even if the peak demand was used for only a small portion of the day. It will be understood that diagrams 1510 and 1530 are very simplistic for purposes of illustration, and a real peak demand curve would have a significant number of peaks and valleys. The end result is that the customer pays for the "whole box" from the 100% mark to the entire day's demand. However, it is typical for peak demand to occur for a short period of the day, and to have lower demand for other portions of the day. The "white" space is demand paid for by rate, but not used. Thus, for diagram 1510, there is a significant amount of underutilization 1516, which is the white space, because peak demand 1514 places max 1512 fairly high relative to the average usage.

Load factor control by iGOS can eliminate the peak demand by adjusting the operation of the local system. Thus, in diagram 1530, peak demand 1514 is shown as being reduced utility demand 1522. The reduced peak demand means that max 1532 is much lower relative to the average usage, and peak demand 1534 is significantly different. Underutilization 1536 is correspondingly much smaller as well. The iGOS includes the use of hardware that can provide any combination of real and reactive power. The iGOS system can also manage use and production to draw energy from the grid in intelligent ways to improve grid operations, as well as to maximize value usage by the node. In one embodiment, iGOS utilizes a four quadrant meter to manage and control load factor.

Thus, by intelligent use of the DER energy resource, iGOS can significantly reduce the demands on the grid, offering significant savings to the customer. The utility also benefits, because they do not have to have as much capacity available to satisfy such a high peak demand, but can even out the operation of the grid, which provide stability. The worst-case scenario, which is usually among the dominant design criteria, is a reduced worst case, which increases efficiency of the grid.

Figure 16:
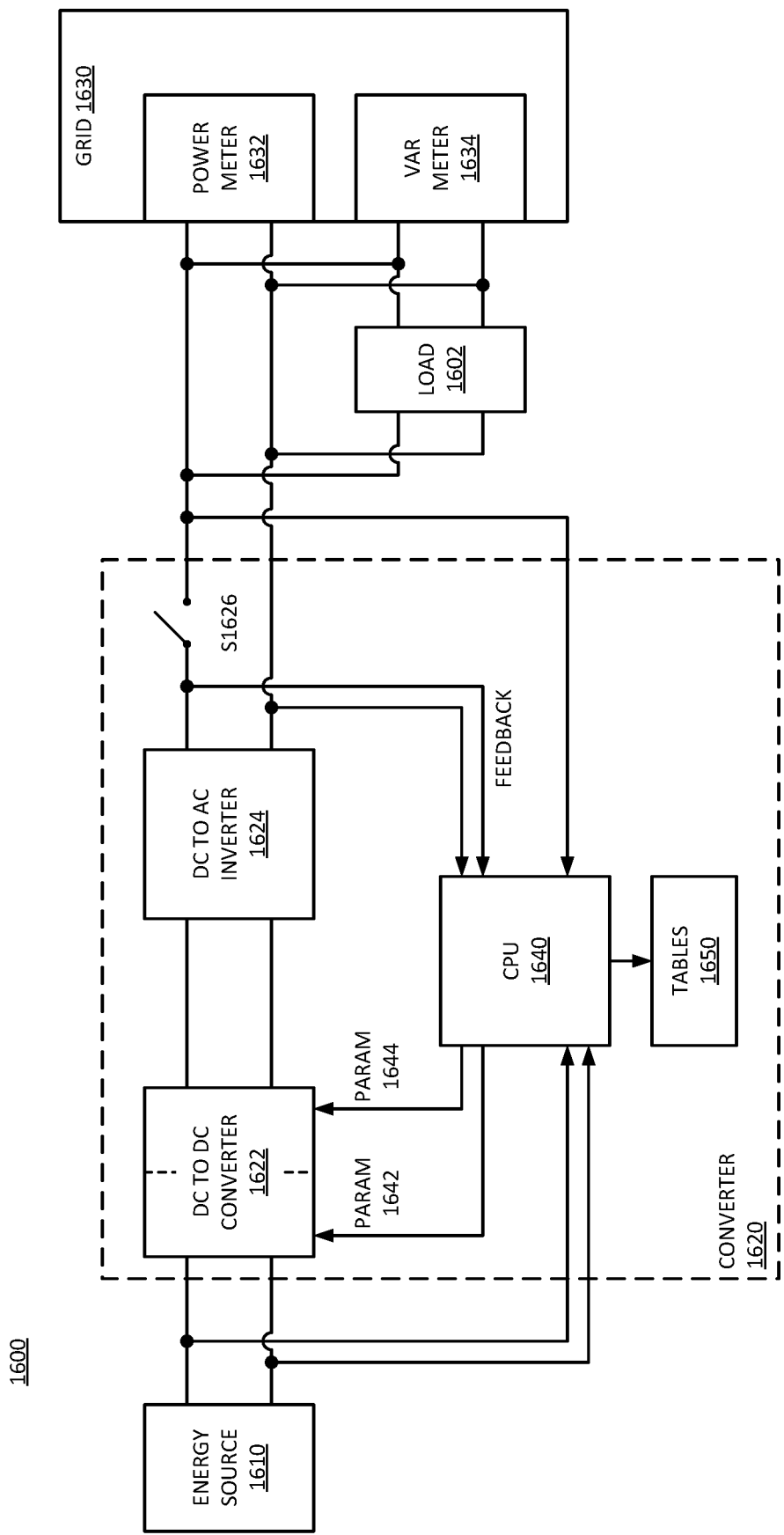
FIG. 16 is a block diagram of an embodiment of a system that transfers power from a local source to a grid-tied load with reactive power injection.

FIG. 16 is a block diagram of an embodiment of a system that transfers power from a local source to a grid-tied load with reactive power injection. System 1600 illustrates a grid-tied converter that couples to an energy source, a load, and a grid. Converter 1620 of system 1600 represents a converter for a DER node, which can be in accordance with any embodiment described herein. System 1600 represents a power system that includes metastable energy source 1610, converter 1620, load 1602, and utility power grid 1630. Load 1602 represents a consumer tied to grid 1630. Grid 1630 can be any embodiment of a grid network described herein. Metastable source 1610 (e.g., solar cells/array, wind power generator, or other time-varying or green power source) and converter 1620 are local to load 1602, as being on a same side of a PCC, and provide power to the load. In one embodiment, metastable source 1610 produces a variable/unstable source of DC power. The source may be time-varying and/or change in available power due to environmental conditions. Converter 1620 represents a dynamic power extractor and inverter apparatus.

Source 1610 is a variable or unstable power source. System 1600 includes converter 1620, which includes DC/DC converter 1622, coupled to DC/AC inverter 1624, both of which are coupled to and controlled by controller (CPU) 1640. Additionally, switching device S1626 (e.g., a relay) selectively connects the inverter to load 1602 and grid 1630. Under normal operation, DC power is drawn from source 1610, and extracted, inverted, and dynamically treated by converter 1620, to dynamically produce maximum AC current relatively free of harmonic distortion and variability, and at a desired phase with respect an AC voltage signal from grid 1630. Putting the generated AC current in phase with the grid AC voltage produces AC power with a power factor at or near unity to load 1602, meaning that all reactive power drawn by the load comes from grid 1630. If source 1610 produces enough energy to satisfy the real power requirements of load 1602, converter can cause the only AC power drawn from grid 1630 by the load to be exclusively or nearly exclusively reactive power. When source 1610 is unable to produce DC power sufficient to completely satisfy the power demand from load 1602, converter 1620 can adjust an interface to allow real power to flow from grid 1630 to load 1602.

In one embodiment, converter 1620 can generate AC current intentionally out of phase to a certain extent with respect to the AC voltage signal of the grid. Thus, the single converter 1620 can deliver power at any desired power factor to compensate for conditions of power on power grid 1630. In one embodiment, multiple converters 1620 can operate in parallel at the same interface, and each can generate power with the same power factor, or each can be dynamically configured to produce different mixes of real and reactive power.

When energy source 1610 generates sufficient power to satisfy load 1602, the inverter current and the grid current will flow towards grid 1630. In general, power can be given back generally to the grid, and the consumer can be appropriately compensated for power provided to the grid. In one embodiment, a give back scenario can involve providing power to a neighbor consumer, in accordance with any embodiment described herein.

In one embodiment, power meter 1632 represents a meter to measure real power consumed by load 1602. In one embodiment, VAR meter 1634 represents a meter to measure the reactive power consumed by load 1602. In one embodiment, power meter 1632 and VAR meter 1634 can be combined physically and/or functionally by a meter. The meter can be on the side of grid 1630. In one embodiment, the meter (combining meters 1632 and 1634) is located with a PCC to connect to the grid, and is part of a DER node with converter 1620. Such a meter can be in accordance with any embodiment described herein. In one embodiment, typically meter 1632 measures the voltage and current and computes power from those measurements. It will be understood that in the case only reactive power is drawn from grid 1630, power meter 1632 will not measure any power usage by load 1602. VAR meter 1634 can measure and compute the reactive power drawn, such as by measuring the phase of the current and voltage of the grid power at the load, and performing calculations based on the measured values.

As discussed, in one embodiment, the power factor delivered by converter 1620 to load 1602 is at or near 1.0 relative to grid 1630. Thus, converter 1620 can perform power factor correction. In one embodiment, converter 1620 can provide harmonic distortion correction. In one embodiment, converter 1620 provides table-based harmonic distortion correction. Previous harmonic distortion techniques use a hardware-based method or Fast Fourier Transform (FFT). The table-based method implemented on a processor or controller reduces cost per inverter and scales better than typical hardware implementations, and can be in accordance with what is described with reference to system 800.

Inverter 1624 of converter 1620 generates output in accordance with a desired power factor (unity or otherwise). In one embodiment, inverter 1634 monitors the operating conditions at the point of connection to load 1602, and provides maximum power from source 1610 dynamically and in real time with changes in the energy source and current load. Thus, if the amount of energy generated by source 1610 changes, converter 1620 can modify the output based on that source in real time. Additionally, if the resistive conditions of load 1602 (e.g., an inductive motor such as a vacuum is turned on), converter can automatically generate changes to power output to track the needs of the load. All such changes can occur in realtime as conditions vary. In one embodiment, converter 1620 can provides output adjustments that provide total harmonic distortion control for harmonic distortion more efficiently than what is required by standards, thus complying with standards and improving performance of the system by dynamically adjusting to variable and unstable power sources, and to a changing load.

It will be understood that if the output voltage and current of converter 1620 are matched in phase with each other and with the voltage on the grid (e.g., through a phase lock loop, or through a power generation sampling and feedback mechanism), any reactive power necessary will be absorbed from the grid. The more real power provided by source 1610, the further out of phase the grid voltage and the grid current will be locally at load 1602. If all real power is provided locally, the current and voltage of the grid will be 90 degrees out of phase locally at load 1602, causing the grid real power contribution to fall to 0 (recall that Preal=(Vmax*Imax/2)cos(Vphase−Iphase)).

In one embodiment, DC to DC converter 1622 of power converter 1620 includes input and output portions, as represented by the dashed line separating the device into two portions. The portion coupled to source 1610 can be referred to as an input portion, and the portion coupled to DC to AC inverter 1624 can be referred to as the output portion. In one embodiment, the operation of converter 1622 is to vary input impedance and output impedance to transfer energy from source 1610 to inverter 1624. In one embodiment, converter 1622 can be referred to as a power extractor.

Converter 1622 can impedance match to change an interface on the input to maximize energy transfer from source 1610 without fixing the voltage or current to specific values. Rather, the input can allow the power to float to whatever voltage is produced by source 1610, and the current will match based on whatever total power is produced. Similarly, on the output, converter 1622 impedance matches to change an output interface to allow the load (in this case, inverter 1624) to draw whatever power is needed at whatever voltage the inverter operates at. Thus, the output of converter 1622 can float to match the voltage of inverter 1624, and generate current to match the total power. Converter 1622 can generate an output current waveform, where the magnitude is determined by how much energy is available, and whatever voltage inverter 1624 is at. Thus, the output floats to match the load, and is not fixed at current or voltage. An internal node within converter 1622 can act as an energy reservoir, where the input impedance matching enables the efficient charging of the internal node, and the output impedance matching enables the load to draw energy from the internal node. The input and output both couple to the internal node via inductors and/or transformers to isolate the input and output from each other and from the internal node.

Controller 1640 can monitor the AC current, which moves out of DC/AC inverter 1624, and the generated voltage of grid 1630, which appears across load 1602. Controller 1640 controls at least one electrical parameter of the interfaces of converter 1622 to control its operation. Parameters 1642 and/or 1644 represent control from controller 1640 to control the operation of converter 1622 within converter 1620. In one embodiment parameters 1642 and/or 1624 may be a duty cycle of a switching signal of the power extraction, which changes input and/or output impedance matching, which in turn controls the charging and drawing from the internal node. The modification of each parameter can be dependent on the quality of the monitored current and voltage. Controller 1640 further controls switching device S1626 to couple the load to power produced (by converter 1622 and inverter 1624 from source 1610), when suitably conditioned power is available for use by load 1602.

In one embodiment, converter 1620 includes tables 1650, which provides a table-based method for controlling power factor, to adjust the operation of converter 1620 to generate reactive power as desired. The tables may include entries that are obtained based on input conditions measured from the system, to achieve a desired mix of real and reactive power. Feedback from the grid-tied node may include voltage zero crossing, voltage amplitude, and current waveform information. With such information, controller 1640 uses tables 1650 to adjust the operation of converter 1622 and/or inverter 1624. The tables may include setpoints that provide idealized output signals the system attempts to create. By matching output performance to an idealized representation of the input power, better system performance is possible than simply attempting to filter and adjust the output in traditional ways.

In one embodiment, system 1600 can be applied without a specific energy source 1610. For example, converter 1620 can be coupled to receive power from grid 1630, and generate an output to load 1602 that provides whatever mix of real and reactive power is needed by load 1602. In one embodiment, converter 1622 can be adjusted to receive AC input. In one embodiment, a connection to converter 1622 can be configured with hardware to generate DC power from the grid, such as an AC to DC converter. However, it will be understood that such conversion cause some inefficiency. In one embodiment, converter 1622 can be implemented with an input transformer that will enable connection between grid power and the internal node.

Figure 17:
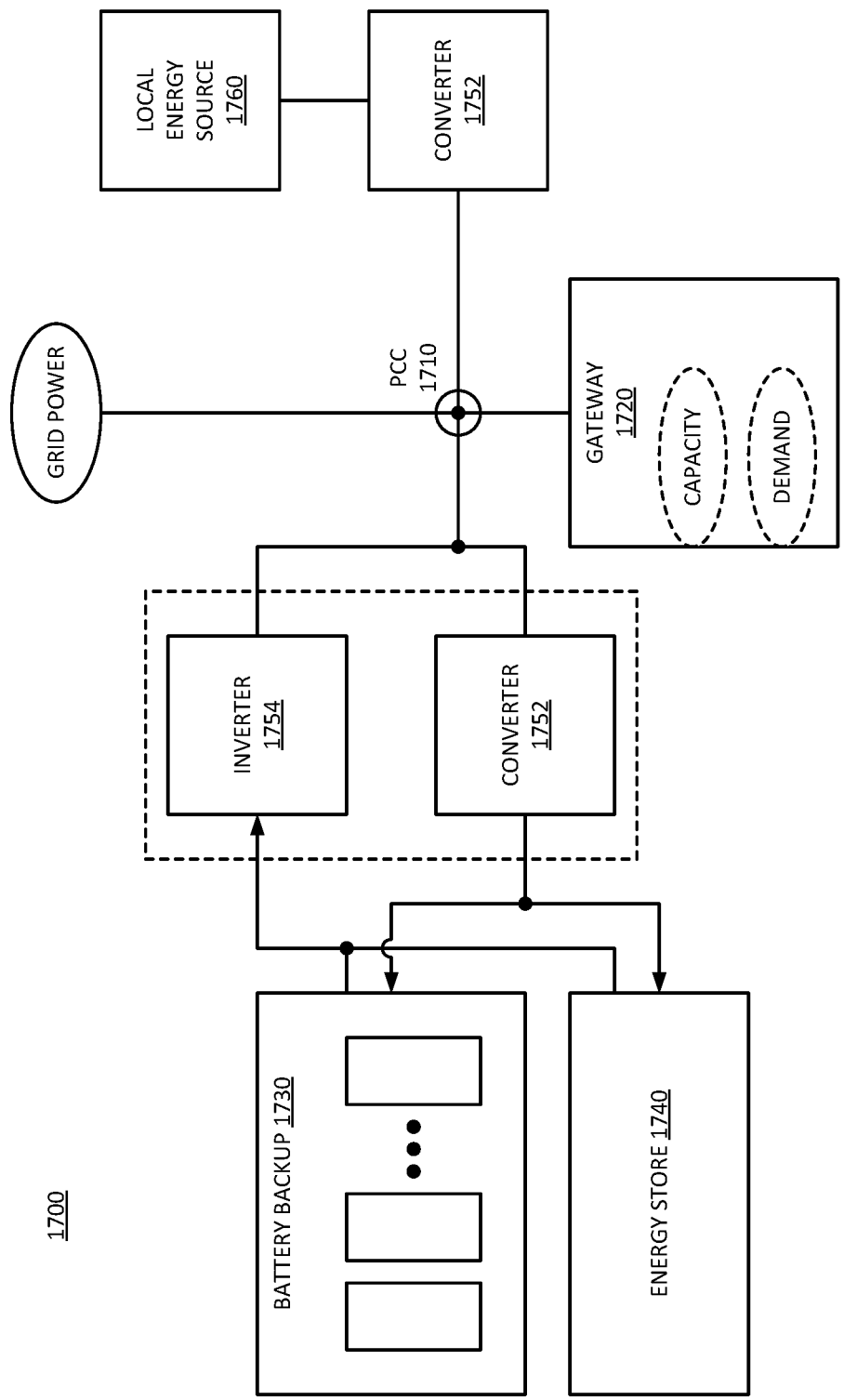
FIG. 17 is a block diagram of an embodiment of a consumer node having intelligent local energy storage.

FIG. 17 is a block diagram of an embodiment of a consumer node having intelligent local energy storage. System 1700 represents a consumer node or an area within a PCC in accordance with any embodiment described herein. System 1700 specifically shows a configuration where local energy storage is combined with local energy generation at a consumer node. System 1700 can be or include a DER node in accordance with any embodiment described herein.

PCC 1710 represents an interconnection point to a grid network. Grid power represents power drawn from the grid. In one embodiment, system 1700 includes gateway 1720 to aggregate information and control operation within system 1700 based on the aggregation information. Gateway 1720 can manage the capacity and the demand for system 1700. The capacity refers to the ability of system 1700 to generate power locally. The demand refers to the load demand locally for system 1700, which comes from loads (not specifically shown).

In one embodiment, system 1700 generates capacity with one or more local energy sources 1760. Local energy source 1760 can be any type of energy generation system. In one embodiment, the energy generation mechanisms of local energy source 1760 generate real power. In one embodiment, local energy source 1760 represents an energy generation mechanism with an associated power converter and/or inverter. When source 1760 includes a power converter/inverter, it can be referred to as an energy generation system. Solar power systems are commonly used at customer premises, and source 1760 can be or include a solar power system.

System 1700 includes one or more energy conversion or power converter devices to control the flow of energy within the PCC. In one embodiment, converter 1752 and inverter 1754 represent power converter devices for system 1700. In one embodiment, each inverter includes a power converter. In one embodiment, a power converter represents an energy conversion device that enables efficient coupling between a source and a load, such as what is described in reference to system 1600. Devices 1752 and/or 1754 provide control of the interchange of energy within system 1700. In one embodiment, each energy source includes an inverter and/or converter. Thus, the devices represented in the dashed box represent devices that can be spread throughout system 1700. Each consumer node can include multiple converter devices for the control of energy flow. In one embodiment, each energy storage resource includes an inverter and/or converter.

System 1700 includes one or more energy storage resources. As illustrated, battery backup system 1730 represents a system of commercial batteries to store energy. Energy store 1740 represents a non-battery backup or energy storage device or system, but battery backup will be understood as a specific example of energy store. Examples of non-battery backup can include systems that include a pump or other motorized device that convert active power within system 1700 into kinetic energy. For example, energy store 1740 can pump water or other liquid against gravity, can compress air or other gas, can lift counterweights again gravity, or perform some other function to convert energy into work to store in a system. The stored energy can be retrieved later by using a reverse force (e.g., gravity or decompression) to operate a generator. Thus, the energy storage system can convert the kinetic energy back into active power for system 1700.

In one embodiment, converter 1752 can be used to charge an energy store (e.g., 1730, 1740) when it is depleted or partially depleted. In one embodiment, inverter 1754 can be used to convert energy from the energy store into active power. Gateway 1720 can intelligently control the use of energy storage 1730, 1740. For example, gateway 1720 can monitor grid conditions to know when the least "expensive" time to charge the energy storage is. Sometimes grid power is less expensive and can be converted into stored energy for later use. Sometimes there is excess capacity from energy source 1760 that can be stored locally in energy storage 1730, 1740.

In general, in one embodiment, system 1700 includes local energy source 1760, and local energy store 1730, 1740 on a consumer side of PCC 1710. System 1700 also includes a local energy conversion device such as converter 1752 and/or inverter 1754 to control the flow of energy to and from the energy storage in system 1700. The energy conversion enables system 1700 to access energy from the energy store and/or to charge the energy store. In one embodiment, system 1700 charges energy store 1730, 1740 from grid power. In one embodiment, system 1700 charges energy store 1730, 1740 from energy source 1760. In one embodiment, system 1700 powers a local load to meet local power demand from energy in energy store 1730, 1740. In one embodiment, system 1700 transfers power to the grid from energy store 1730, 1740. The use of stored energy can include the conversion of the energy to any mix of real and reactive power needed for the local load and/or the grid, depending on where the energy is being transferred.

Figure 18:
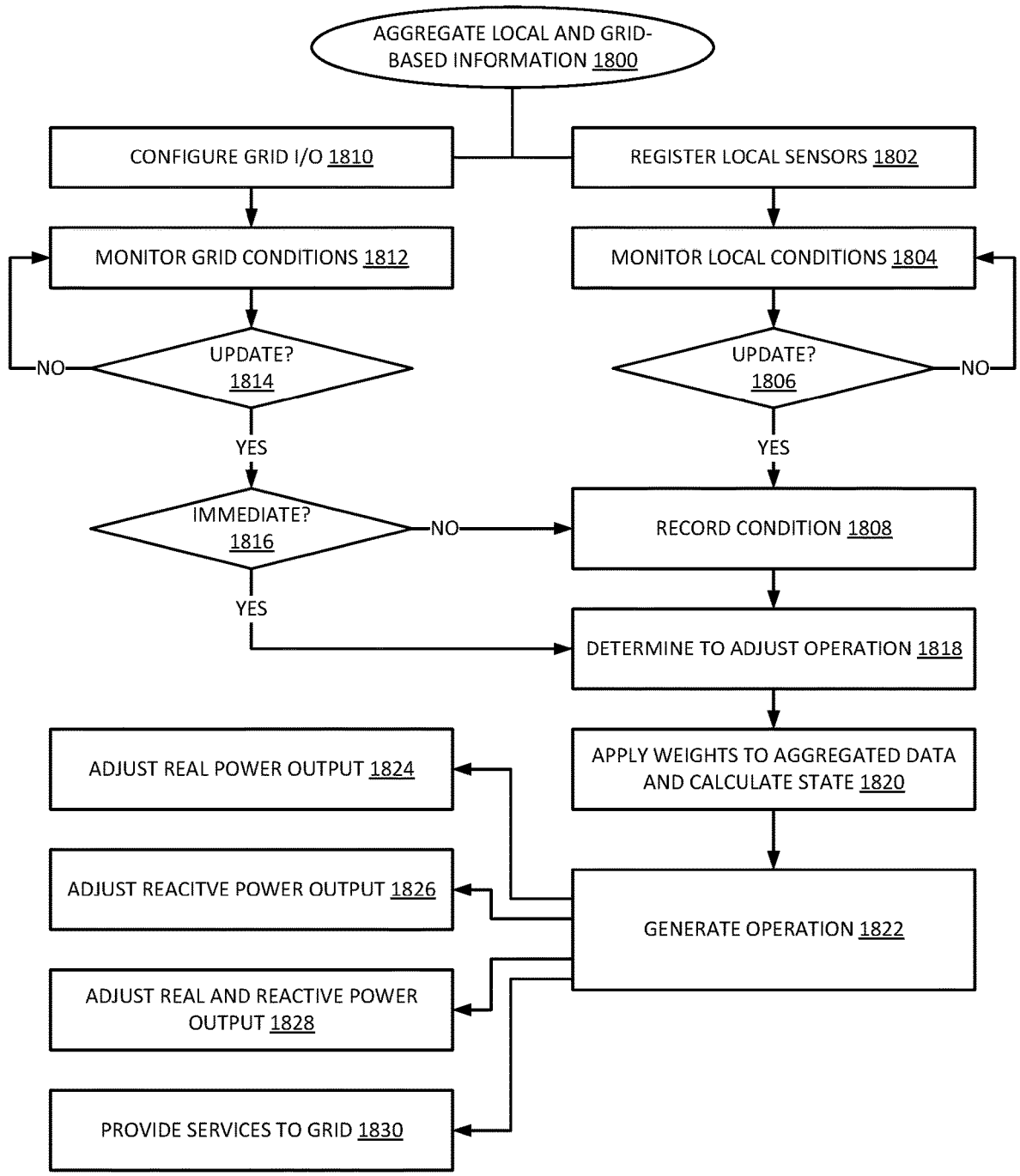
FIG. 18 is a flow diagram of an embodiment of a process for aggregating local and grid-based condition information.

FIG. 18 is a flow diagram of an embodiment of a process for aggregating local and grid-based condition information. Process 1800 for aggregating local and grid-based information to make a decision based on the aggregation of information can be performed by elements of a control node. In one embodiment, the control node includes a gateway device, which can be or include an aggregator. For simplicity, and not by way of limitation, the description of process 1800 refers to operations by an aggregator. The aggregator can be in accordance with any embodiment of an aggregator described herein. In one embodiment, the aggregation information includes information gathered by a local meter that measures local and/or external grid conditions.

In one embodiment, process 1800 includes monitoring for local sensors and monitoring for grid condition information. In one embodiment, local sensors register with the aggregator, 1802. In one embodiment, the aggregator registers the sensors to configure monitoring the data from the sensors, such as frequency of obtaining data from the sensor, and parameters for interconnecting with the sensor. The aggregator can monitor local conditions by data from the sensors, 1804. In one embodiment, the aggregator monitors the sensor until updated information is available. If there is not updated data, 1806 NO branch, the aggregator can continue to monitor the sensor for local conditions, 1804. If there is updated data, 1806 YES branch, in one embodiment, the aggregator records the condition, 1808.

In one embodiment, the aggregator also configures itself for interfacing with grid I/O (input/output), 1810. The grid I/O can enable the aggregator to receive information about grid conditions from outside the local node of which the aggregator is a part. The aggregator can monitor the grid conditions indicated by the grid I/O, 1812. If there is not updated data, 1814 NO branch, the aggregator continues to monitor the grid I/O, 1812. If there is updated data available, 1814 YES branch, in one embodiment, the aggregator determines whether the grid I/O indicates a condition that needs to be addressed immediately. If there is not an immediate need for action, 1816 NO branch, the aggregator can record the grid conditions indicated from the external I/O, 1808.

After recording conditions from the grid and from local sensors, the aggregator can determine to adjust operation at the local control node, 1818. In one embodiment, the aggregator makes a determination based on a schedule. In one embodiment, the aggregator makes a determination of what action to take on each data event, where a data event can be when updated data is available. In one embodiment, if data received from the grid needs immediate attention, 1816 YES branch, the aggregator can determine to adjust the operation of a converter of the control node, 1818.

In one embodiment, the aggregator applies weights to aggregated data and calculates a state or condition, 1820. In one embodiment, the weights can be applied to factor one item of data more than another. In one embodiment where grid information is received requiring immediate attention, the "weight" on that data can be to cause the control node to immediately comply with the request. In one embodiment, the aggregator generates one or more operations to be executed at the consumer node, 1822. In one embodiment, the calculation of state and/or the generation of an operation to execute can include the execution of a heuristics decision algorithm that searches a best match output scenario based on the input conditions.

The operations can be executed by a power converter of the control node, which can be a device of the control node itself, and/or of equipment within the consumer node. In one embodiment, the operations can include one or more of adjusting real power output for the DER, 1824, adjusting a reactive power output for the DER, 1826, adjusting both real power and reactive power output for the DER, 1828, or providing services to the grid, 1830. In the case of providing services to the grid, the services provided can be in response to a market demand. In one embodiment, providing the services will require adjusting operation to provide a different output to satisfy the demand. In one embodiment, satisfying the demand can be performed while continuing to satisfy the demands of a local load. In one embodiment, the system will satisfy the demands of the local load with grid power, to be able to use aggregated generated power to provide market services.

Figure 19:
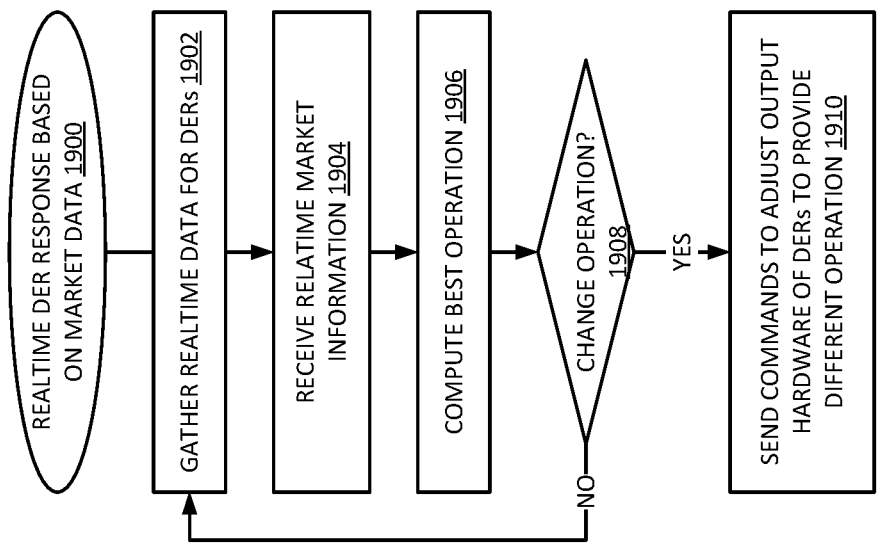
FIG. 19 is a flow diagram of an embodiment of a process for managing distributed energy resources in a grid.

FIG. 19 is a flow diagram of an embodiment of a process for managing distributed energy resources in a grid. Process 1900 for causing a realtime response from a DER based on market data can be performed by an iGOS system. In one embodiment, the system gathers realtime data for the DERs, which can include local customer demand information and local energy generation, 1902. The system also receives realtime market demand information for one or more energy markets, 1904.

Based on the realtime DER information and realtime market information, the system can compute a best operation for the given conditions, 1906. These operations could be referred to as generating and analyzing the data, recognizing that the data can be generated by one or more sensors or other monitoring equipment. Based on what the local DER conditions are and what the current market conditions are, the system can determine if one or more DERs should change operation. If there is to be no change in operation, 1908 NO branch, the system can continue to gather and analyze realtime data, 1902.

If there is to be a change in operation, 1908 YES branch, in one embodiment, the system sends commands to adjust the operation of output hardware of one or more DERs to provide different operation, 1910. It will be understood that adjustment to the operation can include adjusting a proportion of real and reactive power from a DER. Thus, the operations can be referred to as modifying output and inject a proportionally determined amount of real and reactive power to obtain the desired operation. The desired operation can provide services to satisfy a market demand, or adjust operation to provide more beneficial local operation based on the conditions of the grid and the local DER.

In one aspect, a distributed energy resource (DER) node includes: a hardware interface to gather data from one or more sensors that monitor realtime data for the DER node, including local demand information of loads for a customer premises of a power grid, and energy generation for one or more energy sources of the customer premises; a network interface device to couple over a network to a control center, to provide the realtime data for the DER node to the control center; and grid interconnect hardware to adjust apparent power operation for the DER at a point of interconnection to the power grid, including adjusting real power operation or reactive power operation or both real power and reactive power operation of the DER with respect to the power grid, to provide service to the power grid as a participant with a plurality of other DERs as a single energy market resource in response to realtime market demand for the power grid.

In one embodiment, the network interface device is to receive a dispatch control from the control center. In one embodiment, the grid interconnect hardware is to adjust apparent power operation to provide the service, including to provide real power, reactive power, or a combination of real and reactive power from the DER to the power grid. In one embodiment, the grid interconnect hardware is to adjust apparent power operation to provide ancillary services or blackstart services. In one embodiment, the grid interconnect hardware is to adjust apparent power operation to provide non-export services. In one embodiment, the grid interconnect hardware is to adjust apparent power operation to provide one or more of voltage support, VAR support, regulation up, regulation down, frequency support, or demand/response services. In one embodiment, the grid interconnect hardware is to adjust apparent power operation to provide an energy response with either local battery resources or local energy generation resources to provide for at least some of a realtime market demand for the power grid. In one embodiment, the grid interconnect hardware is to adjust apparent power operation including to satisfy local demand with power from the power grid and to provide an energy response with either local battery resources or local energy generation resources to provide at least some of the realtime market demand for the power grid. In one embodiment, further comprising: a four-quadrant energy meter to determine a quadrant of apparent power operation for the customer premises based on inflow or outflow of both real power and reactive power. In one embodiment, the grid interconnect hardware is to adjust apparent power operation including to change a quadrant of apparent power operation in realtime based on market demand for the power grid. In one embodiment, the grid interconnect hardware is to adjust apparent power operation including to change a quadrant of apparent power operation in realtime in response to one or more control signals from the control center. In one embodiment, further comprising: a battery to provide local storage, wherein the realtime data for the DER node further includes a storage capacity of the DER.

In one aspect, a method for energy distribution in a grid network includes: aggregating realtime data for multiple distributed energy resources (DERs), including customer demand information of local customers of the DERs and energy generation for the DERs; receiving realtime market demand information for one or more energy markets; and providing a service from a plurality of the DERs as a single energy market resource in response to the realtime market demand.

In one embodiment, aggregating realtime data further comprises determining a storage capacity of the DERs. In one embodiment, receiving realtime market demand information comprises receiving a dispatch control from a utility grid operator. In one embodiment, providing the service comprises providing real power, reactive power, or a combination of real and reactive power from one or more DERs to a utility grid. In one embodiment, providing the service comprises providing ancillary services or blackstart services. In one embodiment, providing the service comprises providing non-export services. In one embodiment, the plurality of DERs comprises all of the DERs. In one embodiment, providing the service comprises sending control signals to change an operation of the plurality of DERs. In one embodiment, the customers of the DERs are consumers in the one or more energy markets. In one embodiment, providing the service comprises providing an energy response with customer supply based on the combined data to provide for at least some of the realtime market demand for a utility grid. In one embodiment, providing the energy response with customer supply comprises using customer supply to provide the service while satisfying customer demand with power from the utility grid. In one embodiment, further comprising: computing an ability to satisfy the realtime market demand with combined energy generation of the multiple DERs.

In one aspect, an apparatus comprising means for performing operations to execute a method for energy distribution in a grid network in accordance with any of the preceding two paragraphs. In one aspect, an article of manufacture comprising a computer readable storage medium having content stored thereon, which when accessed provides instructions to cause a machine to perform operations to execute a method for energy distribution in a grid network in accordance with any of the preceding two paragraphs.

In one aspect, a system includes: multiple distributed energy resources (DERs) including local energy generation resources at customer premises; and a control center coupled to the DERs, the control center including communication hardware to couple to the DERs to receive and aggregate realtime data for the DERs, including local customer demand information of local customers of the DERs and energy generation for the DERs; and processing hardware to compute, based on the realtime data for the DERs and on realtime market demand information for one or more energy markets, a bid to provide services to the one or more energy markets based on an aggregation of the local energy generation of the multiple DERs, with a plurality of the DERs as a single energy market resource.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A distributed energy resource (DER) node, comprising:
a four-quadrant energy meter to gather realtime data for a customer premises, including information about local demand and information about energy generation to indicate inflow and outflow of both real power and reactive power for the customer premises from a power grid;
a node controller to determine from the realtime data, a quadrant of apparent power operation for the customer premises, and determine based on grid conditions of the power grid, a desired quadrant of apparent power operation for the customer premises; and
a power converter to adjust a ratio of real power to reactive power to change the quadrant of apparent power operation to the desired quadrant of apparent power operation.

2. The DER node of claim 1, wherein the node controller is to determine the desired quadrant of apparent power operation based on dispatch control received from the power grid.

3. The DER node of claim 1, further comprising:
a sensor to detect the grid conditions of the power grid;
wherein the node controller is to determine the desired quadrant of apparent power operation based on information from the sensor.

4. The DER node of claim 1, wherein the power converter is to adjust the ratio of real power to reactive power, including to provide real power, reactive power, or a combination of real power and reactive power from the energy generation of the DER.

5. The DER node of claim 1, wherein the power converter is to adjust the ratio of real power to reactive power, including to provide reactive power for the local demand from real power from the power grid.

6. The DER node of claim 1, further comprising:
a battery to provide local storage, wherein the realtime data for the DER node further includes a storage capacity of the DER.

7. The DER node of claim 6, wherein the power converter is to adjust the ratio of real power to reactive power, including to provide real power, reactive power, or a combination of real power and reactive power from the local storage of the DER.

8. The DER node of claim 1, wherein the node controller is to determine the desired quadrant of apparent power operation based on realtime market demand for the power grid.

9. The DER node of claim 1, wherein the power converter is to adjust the ratio of real power to reactive power to satisfy the local demand without turning off local loads.

10. The DER node of claim 1, wherein the DER node is one of multiple DER nodes that operate as an aggregation of DER nodes, wherein the node controller is to determine the desired quadrant of apparent power operation for the customer premises as part of the aggregation of DER nodes.

11. A method in a node of a grid network, comprising:
determining, from realtime data gathered with a four-quadrant energy meter for a customer premises, a quadrant of apparent power operation for the customer premises, the realtime data including local demand information and energy generation to indicate inflow and outflow of both real power and reactive power for the customer premises from a power grid;
identifying, based on grid conditions of the power grid, a desired quadrant of apparent power operation for the customer premises; and
adjusting a ratio of real power to reactive power with a power converter of the customer premises to change the quadrant of apparent power operation to the desired quadrant of apparent power operation.

12. The method of claim 11, wherein determining the desired quadrant of apparent power operation comprises determining based on dispatch control received from the power grid.

13. The method of claim 11, further comprising:
detecting the grid conditions of the power grid with a sensor of the customer premises;
wherein determine the desired quadrant of apparent power operation comprises determining based on information from the sensor.

14. The method of claim 11, wherein adjusting the ratio of real power to reactive power includes providing real power, reactive power, or a combination of real power and reactive power from the energy generation of the DER.

15. The method of claim 11, wherein adjusting the ratio of real power to reactive power includes providing reactive power for the local demand from real power from the power grid.

16. The method of claim 11, further comprising:
providing local storage with a battery, wherein the realtime data for the DER node further includes a storage capacity of the DER.

17. The method of claim 16, wherein adjusting the ratio of real power to reactive power includes to provide real power, reactive power, or a combination of real power and reactive power from the local storage of the DER.

18. The method of claim 11, wherein determining the desired quadrant of apparent power operation comprises determining based on realtime market demand for the power grid.

19. The method of claim 11, wherein adjusting the ratio of real power to reactive power comprises satisfying the local demand without turning off local loads.

20. The method of claim 11, wherein the customer premises comprises a distributed energy resource (DER) node of multiple DER nodes that operate as an aggregation of DER nodes, wherein determining the desired quadrant of apparent power operation for the customer premises comprises determining local apparent power operation as part of the aggregation of DER nodes.

* * * * *